US010750345B1

(12) United States Patent
Tengwall et al.

(10) Patent No.: US 10,750,345 B1
(45) Date of Patent: Aug. 18, 2020

(54) SECURE EMERGENCY RESPONSE TECHNOLOGY

(71) Applicant: Digital Management, LLC, Bethesda, MD (US)

(72) Inventors: Christopher Tengwall, Annapolis, MD (US); Eric Harris, Bel Air, MD (US); Joseph W. Cole, Jr., Mason Neck, VA (US); Jeremy R. Hettenhouser, Martinsburg, WV (US); Richard P. Cann, St. Petersburg, FL (US); Christopher T. Williams, Arlington, VA (US)

(73) Assignee: DIGITAL MANAGEMENT, LLC, Bethesda, MD (US)

( * ) Notice: Subject to any disclaimer, the term of this patent is extended or adjusted under 35 U.S.C. 154(b) by 0 days.

(21) Appl. No.: 16/509,661

(22) Filed: Jul. 12, 2019

Related U.S. Application Data

(60) Division of application No. 15/703,550, filed on Sep. 13, 2017, now Pat. No. 10,356,591, which is a continuation-in-part of application No. 14/976,991, filed on Dec. 21, 2015, now Pat. No. 9,769,639.

(60) Provisional application No. 62/194,203, filed on Jul. 18, 2015.

(51) Int. Cl.
*H04W 4/90* (2018.01)
*H04W 4/02* (2018.01)
*H04W 76/50* (2018.01)

(52) U.S. Cl.
CPC ............... *H04W 4/90* (2018.02); *H04W 4/02* (2013.01); *H04W 76/50* (2018.02)

(58) Field of Classification Search
CPC .......... H04W 4/90; H04W 76/50; H04W 4/02
See application file for complete search history.

(56) References Cited

U.S. PATENT DOCUMENTS

| 6,037,991 | A | * | 3/2000 | Thro | .............. H04N 7/147 348/443 |
|---|---|---|---|---|---|
| 8,768,294 | B2 | | 7/2014 | Reitnour | |
| 9,210,529 | B2 | | 12/2015 | Huang | |
| 9,426,638 | B1 | | 8/2016 | Johnson | |
| 9,432,806 | B2 | | 8/2016 | Zises | |
| 9,769,639 | B2 | * | 9/2017 | Cole, Jr. | .............. H04W 4/02 |
| 9,773,020 | B2 | | 9/2017 | Kerr | |
| 10,356,591 | B1 | * | 7/2019 | Tengwall | .............. H04W 4/90 |

(Continued)

*Primary Examiner* — Brandon J Miller

(57) ABSTRACT

Technology for securely processing emergency response. The technology includes combining video data from multiple video sources relating to an emergency response scenario. The video data is combined into a multi-video feed that utilizes a particular amount of bandwidth when delivered. From a display of a multi-video feed, a video source may be selected. A single-video feed is then delivered for the selected video source and the single video feed is utilized substantially the same bandwidth and the multi-video feed. Dynamic geofences may also be generated. The dynamic geofence is based on an object that is capable of moving. When the object moves, the dynamic geofence also moves such that the boundaries of the dynamic geofence are fixed relative to the object, even as the object moves. Group members may be associated with the dynamic geofence such that they are alerted when a group member crosses the dynamic geofence boundary.

20 Claims, 27 Drawing Sheets

(56) References Cited

U.S. PATENT DOCUMENTS

| | | | |
|---|---|---|---|
| 2002/0042278 A1* | 4/2002 | Crockett | H04L 29/06 455/456.1 |
| 2004/0098753 A1* | 5/2004 | Reynolds | H04N 7/17318 725/135 |
| 2005/0071782 A1* | 3/2005 | Barrett | H04N 5/45 715/838 |
| 2009/0233634 A1 | 9/2009 | Aghili | |
| 2010/0042940 A1 | 2/2010 | Monday | |
| 2010/0240339 A1 | 9/2010 | Diamond | |
| 2011/0069172 A1* | 3/2011 | Hazzani | G08B 13/19645 348/159 |
| 2012/0190295 A1 | 7/2012 | Kim | |
| 2013/0346333 A1* | 12/2013 | Hassler | G06Q 10/107 705/325 |
| 2014/0045516 A1 | 2/2014 | Turgman | |
| 2014/0293046 A1* | 10/2014 | Ni | H04N 7/181 348/143 |
| 2014/0373045 A1 | 12/2014 | Bartolome | |
| 2015/0111524 A1 | 4/2015 | South | |
| 2015/0148077 A1 | 5/2015 | Jelle | |
| 2015/0163626 A1 | 6/2015 | Zimmer | |
| 2015/0208103 A1* | 7/2015 | Guntur | H04N 19/46 725/61 |
| 2015/0208220 A1 | 7/2015 | Hulan | |
| 2015/0213708 A1 | 7/2015 | Barzangi | |
| 2015/0301543 A1 | 10/2015 | Janoso | |
| 2015/0365796 A1 | 12/2015 | Toni | |
| 2016/0261424 A1 | 9/2016 | Gamberini | |
| 2016/0283793 A1* | 9/2016 | Leckey | G06K 9/00221 |

\* cited by examiner

SECURE EMERGENCY RESPONSE TECHNOLOGY

CROSS-REFERENCE TO RELATED APPLICATIONS

This application is a divisional of U.S. patent application Ser. No. 15/703,550, now U.S. Pat. No. 10,356,591, filed on Sep. 13, 2017 and having the title "Secure Emergency Response Technology," which is incorporated by reference herein in its entirety. U.S. application Ser. No. 15/703,550 is a continuation-in-part of U.S. patent application Ser. No. 14/976,991, now U.S. Pat. No. 9,769,639, filed on Dec. 21, 2015 and having the title "Secure Emergency Response Technology," which is incorporated by reference herein in its entirety. U.S. patent application Ser. No. 14/976,991 claims priority to U.S. Provisional Application No. 62/194,203, filed on Jul. 18, 2015 and having the title "Secure Emergency Response Technology." The entirety of that provisional application is incorporated herein by reference. To the extent appropriate, priority is claimed to each of the above referenced applications.

BACKGROUND

Emergency response technology of the past has often fallen short of the needs of both the potential victims in emergency situations and the responders to the emergency as well. When an emergency situation occurs, time is of the essence for potential victims. A lapse of a few minutes can be the difference between life or death.

It is with respect to these and other general considerations that examples have been made. Also, although relatively specific problems have been discussed, it should be understood that the examples should not be limited to solving the specific problems identified in the background.

SUMMARY

The technology described herein provides methods and systems for secure emergency response. The technology includes an emergency response server that determines an emergency situation is occurring at a particular location. The determination may be made based upon user input received at a secure portal device or from a personal device associated with a user in distress. The emergency response server is able to then determine a potential victim or group of potential victims that may be affected based on a last-reported location of a potential victim's client device. Once the location and one or more client devices associated with potential victims have been identified, a secure connection between the emergency server and the client devices of the potential victims can be established to generate a notification about the emergency situation. Triggering the emergency situation not only alerts the user of the emergency situation, but also collects location information from the client device and allows the potential victim to respond with his or her condition along with any other information that would be useful in assisting the potential victim. For instance, the potential victim may indicate that he or she is in trouble via an "SOS." On the other hand, the potential victim may also indicate that he or she is currently in a good condition and does not require assistance. Each of these responses from potential victims is tracked and the information available to responders is altered accordingly.

The technology is capable of handling communications and data only in a secure manner by rejecting any attempted connection that does not employ predetermined standards of protection, such as, for example, use of the FIPS 140.2 encryption algorithms for all transmitted data and all data processed or stored on the device, server, and/or a remote browser communicating with the server. The system is also capable of communicating via traditional non secure SMS if needed with non-data networked devices. With the secured data, the technology is able to securely notify potential victims of an emergency situation while limiting the risk of any data being intercepted by an unintended recipient. Additional measures may also be taken to ensure the security of the data. For instance, location data for the potential user is discarded when it is no longer needed. During non-emergency situations, the client device reports its location at less-frequent intervals and may also report a less accurate location. Each time the location is reported by client device, the previously stored location at the emergency server and/or client device is overwritten. Thus only one last-known location for a client device is stored. Thus, the history of the device's movement (or the movement of a person associated with a device) cannot be stolen or misused. When a notification is received at the client device indicating an emergency situation, the client device then begins reporting more accurate location for the device at a higher frequency.

In addition, the technology also relates to providing or displaying video data in emergency scenarios. For example, video sources near or related to an ongoing emergency may be identified and the video data from the identified video sources may be combined into a single multi-video feed. The multi-video feed may then be delivered to a user involved in the emergency scenario. From the multi-video feed displayed on the user's device, the user may select one of the video sources in the multi-video feed. In response to the selection, a single-video feed from the selected video source is delivered to the user's device. To improve stability and network utilization, the single-video feed may utilize substantially the same bandwidth as the multi-video feed.

The technology also relates to a establishing a dynamic geofence based on an object that is capable of moving. For example, a map may be displayed on a display screen of a device, and an object capable of moving, such as a car or person, may be displayed on the map. The object may then be selected, and a boundary for a dynamic geofence may be set relative to the selected object. As the object moves, the dynamic geofence moves with the object. For instance, once updated location information is received for the object, the dynamic geofence is transposed such that the boundary of the dynamic geofence remains fixed relative to the object. Members may also be associated with the dynamic geofence and as the members cross the boundary of the dynamic geofence, an alert may be generated.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
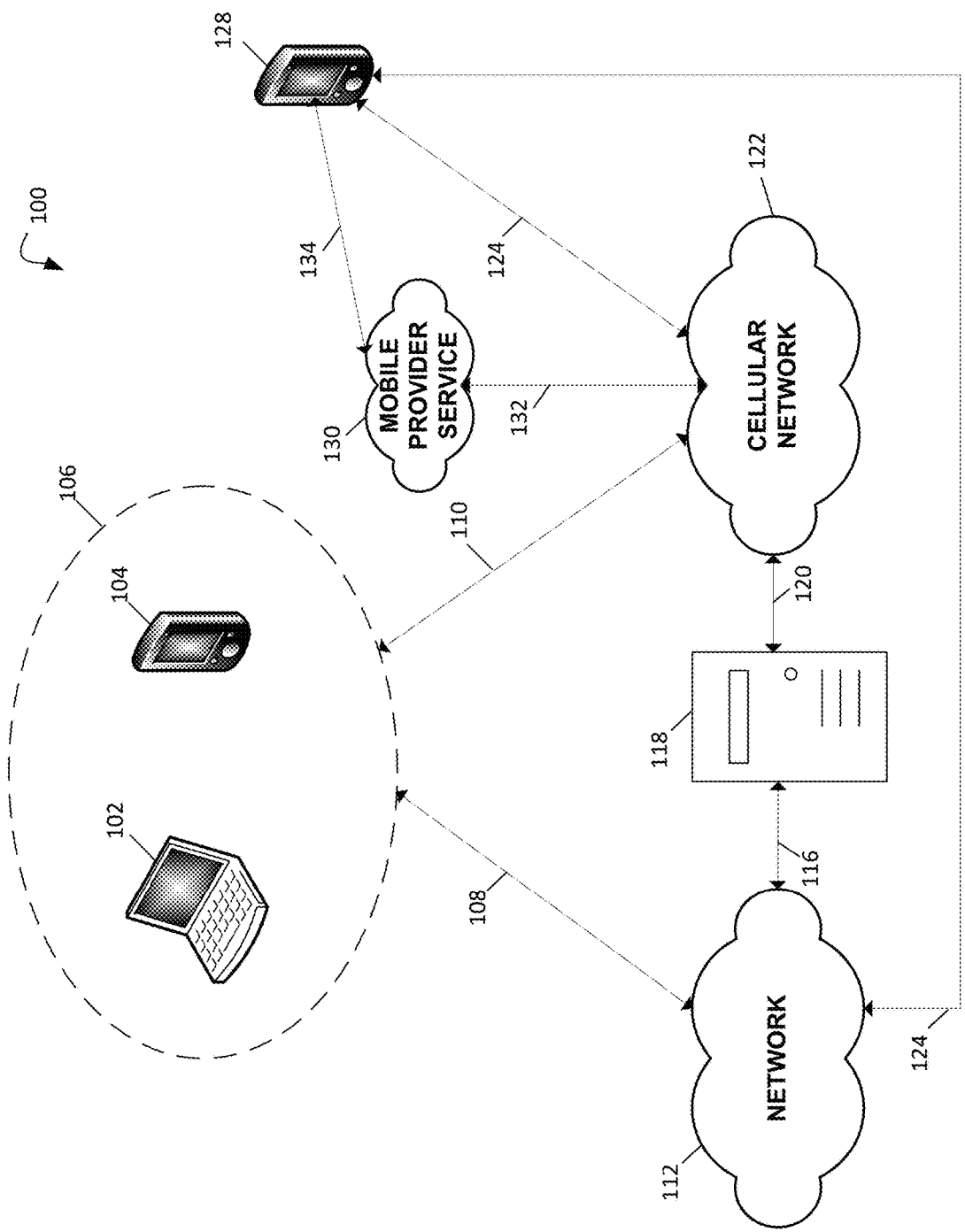
FIG. 1 depicts an example of a system for implementing the secure emergency response technology.

One of the most difficult problems for emergency responders or rescuers is to know the exact location of a potential victim at the time an emergency occurs. Rarely do emergency responders know where the potential victims are located or how many potential victims exist in the emergency area. Further, even as the emergency responders find potential victims, the responders also do not have the capability to prioritize which potential victims should be rescued or treated first.

Similarly, potential victims do not have an effective means to communicate their location and condition when they are involved in an emergency situation. Indeed, many potential victims may not even realize that they are in an emergency situation before it is too late. Previous solutions to solve such problems have fallen short. For instance, attempting to broadcast an emergency situation over traditional local area radio networks results in lower response rates and longer response times. Also hampering that method is the high cost of implementing and maintaining device specific systems. Further the limited bandwidth available within the RF spectrum for additional networks limits the widespread use of such systems by nongovernment entities. In addition, the need to carry a radio that serves no purpose outside of a potentially unforeseen emergency situation leads many people to not have it with them when an emergency situation arises. Many potential victims are not near a radio to hear an emergency alert and, even if the potential victim is able to hear the alert, the potential victim has no way to report their location back to the source of the emergency alert in an authoritative and automated way. Providing emergency notifications using phone trees have also proven to have several drawbacks. When a potential victim receives a phone call and is already in the emergency situation, the potential victim often will not be in a condition where he or she can answer or return a phone call to provide the information needed for rendering assistance. Even if the victim is able to return the phone call, the victim may not know their exact location or how to properly communicate that information. Other dedicated location tracking devices and teams of close-proximity security personnel are cumbersome and do not provide adequate security and privacy concerns for the potential victims. As such, there is a need for an advanced technology that allows both potential victims and emergency responders to be better equipped for handling emergency situations.

The technology disclosed herein addresses at least the following limitations of existing solutions. First, existing systems lack an intuitive design for non-technical users which easily imparts critical information at a glance. Second, existing systems lack any safeguards against abuse by the system owners and authorized administrators lead many users who would benefit from such tools reluctant to use them. Third, existing attempts lack the robust security needed to protect against the increasing vectors of exploitation in today's cyber environment. For instance, existing systems store location history for long periods of time no matter the situation and allow large amounts of people to have access to the data. Further, that location data is often communicated and stored in an insecure manner.

FIG. 1 depicts an exemplary system 100 for providing secure emergency responses. As shown in FIG. 1, the system 100 may include an emergency response sever 118 which can securely communicate via encrypted connections through a cellular network 122 via connection 124 or through the network 112 via connection 124 with a client device 128 or alternatively when needed a non-encrypted cellular link via SMS messaging. The emergency response server 118 may be any type of suitable computing device that is capable of exchanging data over a cellular or network connection, such as the network 112, with a client device. Network 112 may be any type of network such a wide area network (WAN), local area network (LAN), a metropolitan area network (MAN), a campus area network (CAN), a cellular data network, the Internet, and the like. In examples, the emergency response server 118 has input/output components and can be managed locally via connected peripherals or remotely through an emergency response portal using any static or mobile device capable of data exchange. For instance, the emergency response server 118 is controlled by a secure portal device, such as a secure computing device 102 or a secure mobile device 104. In examples, secure portal devices may exist in an authenticated secure realm 106 and communicate with the emergency response server 118 via the encrypted communication channels 108, 110 through the internet 112 and/or a cellular network 122. Accordingly, the emergency response server is able to be controlled remotely by the secure portal devices. In embodiments, the portal devices remotely control the emergency response server 118 through a web browser or an installed application on one or more of the secure portal devices. The communications may also occur across platforms, such as iOS and Android based platforms. In some examples, communications between devices and servers may be made via an Internet connection such that a phone number or a cellular connection may not be required. As such, the technology is still capable of operating based on a wireless internet connection and on devices that are not capable of cellular communication (such as tablets without subscriber identification module SIM card).

The emergency response server 118 communicates with the client device 128, which may be any device capable of data exchange, such as a smartphone or tablet. Devices with location reporting capability can provide this data automatically to the emergency server 118. With a few exceptions, communications between the emergency server 118 and any client device 128 executing an authenticated application (either in the foreground or the background) loaded and associated with an emergency portal instance, or any data enabled device accessing the emergency response server through the portal via a browser, are encrypted for security purposes. In examples, the communications are encrypted using FIPS 140.2 encryption algorithms and standards. However, one of skill in the art will appreciate that other encryption algorithms may be employed with the technology disclosed herein without departing from the spirit or scope of this disclosure. In addition, any information stored by the emergency response server 118 may also be encrypted under the same standards for all data stored and/or in transit between and residing on the emergency management server, client devices, and remote portal connection sessions. The emergency response server 118 also communicates with a mobile provider service 130, such as the Apple Push Notification Service (APNS), and equivalent services for BlackBerry and Google Android, among other providers and/or devices, which in turn can communicate with the client device 128. For example, the emergency response server 118 communicates via connection 132 to the mobile provider service 130 to send a push notification to the client device via connection 134. In examples, the communications between the mobile provider service 130 and emergency response server 118 are not encrypted at all or are not encrypted in the same manner as communications directly between the client device 128 and the emergency response server 118. Due to communications between the emergency response server 118 and the mobile provider service 130 not being encrypted, the present technology includes no Personally Identifiable Information ("PII"), such as any data that can be used to distinguish or trace an individual's identity, either alone or when combined with other personal or identifying information that is linked or linkable to a specific individual, or sensitive data in these push notifications and are used only to wake an app on the client device 128 to take certain secure actions such as enter emergency mode for location reporting purposes and avoids communicating sensitive data to the mobile provider service 130. The emergency response server 118 rejects and does not accept any connection from a client device 128 unless the connection is encrypted to established standards.

In an aspect, the emergency response server 118 determines that a potential victim having a client device 128 may be in an emergency situation. The emergency response server 118 communicates to the mobile provider service 130, or in some examples through an internet provider, that a push notification should be sent to the client device 128. Upon receiving the push notification, the client device 128 then communicates encrypted data directly to the emergency response server 118 to acknowledge that a push notification has been received and the client device 128 takes other pre-defined actions such as reporting location data. In examples, a secure connection is established between the server 118 and the client device 128 prior to sending the secure data. The emergency response server 118 is then able to communicate to the client device 128 details of the emergency situation in an encrypted form.

Communication between the devices shown in FIG. 1 may also be accomplished over any type of network, such as LANs, WANs, cellular networks, Point to Point circuits, Inmarsat, VSAT, and other terrestrial sat terminal connections, and/or the Internet. Further, while described above as single devices, the emergency response server 118 may be made of multiple devices. For instance, in some examples, the methods and systems disclosed herein may be performed using a distributed computing network, or a cloud network. In such examples, the methods and systems disclosed herein may be performed by two or more servers. Although a particular network example is disclosed herein, one of skill in the art will appreciate that the systems and methods disclosed herein may be performed using other types of networks and/or network configurations.

Figure 2:
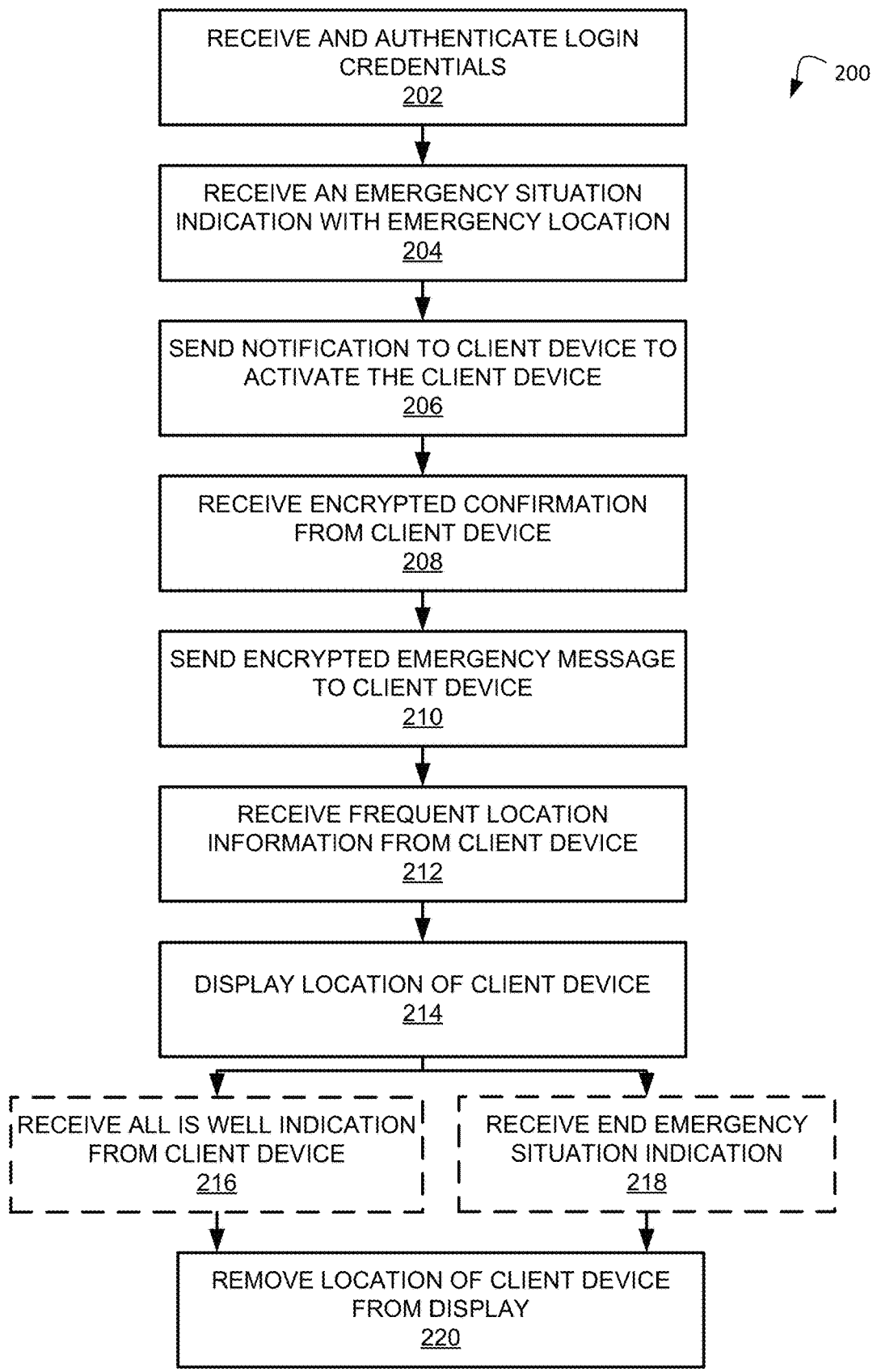
FIG. 2 depicts an example of a method for handling emergency response by a secure emergency response server

FIG. 2 depicts a method 200 for handling emergency responses by an emergency response server, such as emergency response server 118. At operation 202, login credentials are received and verified. For example, user may attempt to login to the server via a secure portal device. In example, a login screen may be presented by web browser. The login screen may present an input box for a username or e-mail address of the user and an input box for a password. An exemplary password may be a 16 character strong password, among other potential types of secure passwords. Once the username and password are received, a sign-in option or a change password option may be presented. In examples, the sign-in option is presented only when the login screen is being accessed from a pre-associated device's browser which is required to contain a session key. If the device attempting to access the emergency server via the sign-on screen and is not pre-associated via the correct session key, the "sign-on" option is changed to an "enroll" option. By replacing the sign-in option with an enroll option upon detecting that the device or browser is not authorized, the functionality to even request access to the emergency response server may be disabled, which provides an additional layer of security such as circumventing access controls via a stolen login and passwords used from any device other than the authorized one. In some examples, any time a new browser is used to access the portal, an authenticated user must initiate the login process via an associated connection and send the user trying to use the new browser an enrollment key. Once the credentials are received and authenticated by the emergency response server, the portal is presented to the user of the secure portal device.

At operation 204, an indication of an emergency situation is received. This emergency response indication may be received from input received at the portal device, and the emergency response indication may also include information about the location of the emergency and the expected duration of the emergency situation. In some examples, the emergency situation indication is automatically determined by the emergency response server based upon a predetermined set of rules. In further examples, the emergency situation indication is received from a client device, such as an "SOS" message from a user. Based on the emergency situation indication, the potentially affected client devices (and the members associated with the devices) are identified. The devices potentially affected by the emergency situation may be determined by the last known location of the client device. The determination may also be further based on a number of predefined factors about a client device or a member or members associated with the client device, such as a home or work addresses, an assigned work section, or other frequently visited locations. As discussed further below, certain groups of members may also be identified based on similar factors shared by the members of each group.

Once the emergency response server receives the emergency situation indication, at operation 206 the emergency response server sends a notification to client devices potentially affected by the danger. The notification activates the client devices for example, by activating one or more applications resident on the client devices. Activation of an application on the resident device may entail causing the application to execute or, if the application is executing in the background, causing execution of the application to move to the foreground. In some examples, the notification is a push notification, the receipt of which causes an application on the client device to awaken. In such examples, data may be sent from the emergency response server to a mobile provider server, such as APNS. APNS then issues the push notification to the client device which in turn causes an application on the client device to become active in a defined mode such as emergency.

At operation 208, an encrypted confirmation is then received from the client device indicating that the client device is ready to receive the encrypted traffic from the emergency response server. Operation 208 may further comprise establishing an encrypted connection between the client device and server prior to receiving the encrypted confirmation. At operation 210, an emergency alert is then sent to the client device as an encrypted signal or message from the emergency response server after receiving confirmation. The encrypted alert signal may be configured to cause the client device to enter an emergency situation mode if the client device is not already in an emergency situation mode. In examples, the emergency alert signal also contains a description of the emergency, the location of the emergency, and the expected duration of the emergency.

At operation 212, frequent location information is then received from the client device. The location information received after the client device enters into an emergency situation mode is received more frequently than when the client device is in a non-emergency mode as a result of the remote action push from the emergency server. The location information received may also be more accurate than the location information received in the non-emergency mode. This provides multiple benefits, including saving battery life of the client device and communication and processor bandwidth due to the client device being able to less frequently report its location unless there is an emergency situation. Where there is a non-emergency situation, the client device may only report a location once every half hour or other similar interval. In examples, when a new location for the client device is received in a non-emergency situation, the prior location data is overwritten. By only storing the last known location, storage space is also conserved at the emergency response server. Further, storing only the last known location also prevents potential personal information from being exploited because a history of the client device's movement is never created in the first place. Yet, the last known location storage still allows for the stored location to be known in situations where the client device becomes inoperable in an emergency situation. The last known location may also be used to determine if the client device is likely to be affected by an emergency. When the emergency situation is declared, in some examples, the entirety of the location data received during the emergency situation may be stored for a longer period of time. In some examples, to protect the privacy of members, the location data and other data collected during an emergency situation may be maintained for a predetermined amount of time such as, 72 hours, or another similar time frame after the emergency ends. The predetermined amount of time may be dynamic in that the data is maintained may be dependent upon the type of the emergency such that the data may be maintained for longer after certain types of emergencies. In examples, all location data stored saved during an emergency is scrubbed from the server after the predetermined time and cannot be reconstituted. This timed scrubbing feature combined with the overwriting of location data on top of the last entry ensures protection of privacy for users.

When the emergency situation is indicated for a member and the location information for that user's client device is received, the location of the client device is displayed in a portal interface at operation 214. The location of the user may be displayed as a colored pin indicating the status of the member as discussed further below. In addition, data may be logged reflecting each security user of a portal device that views a member's location. The location of each member is only displayed during an emergency situation.

Following the display of the location of the client device, the emergency response server may receive an all is well indication from a client device at operation 216 or the emergency response server may receive an end emergency situation indication at operation 218. The all is well indication is received from the client device and causes the emergency situation for that particular client device to end. The end emergency situation indication causes the emergency situation to end for all client devices affected by the particular emergency that has ended. Upon receiving an indication that the emergency situation has ended, the member's location is no longer displayed at operation 220 and an encrypted message is sent to the client device indicating that the emergency situation has ended and their location is private again. If the all is well signal is received, a representative color or indicator for the member may change on the display, or in other examples, the member's location will no longer be displayed.

In other situations, the all is well indication may not be received from the client device. For instance, after sending the "SOS" message, the user may become non-responsive due to the emergency situation. If no other messages are received from the client device after an "SOS" message or the user is otherwise non-responsive, additional features of the client device may be activated remotely and monitored. For example, a camera or microphone of the client device may be activated remotely so that the user's condition may be more accurately assessed and help can be sent accordingly.

Figure 3:
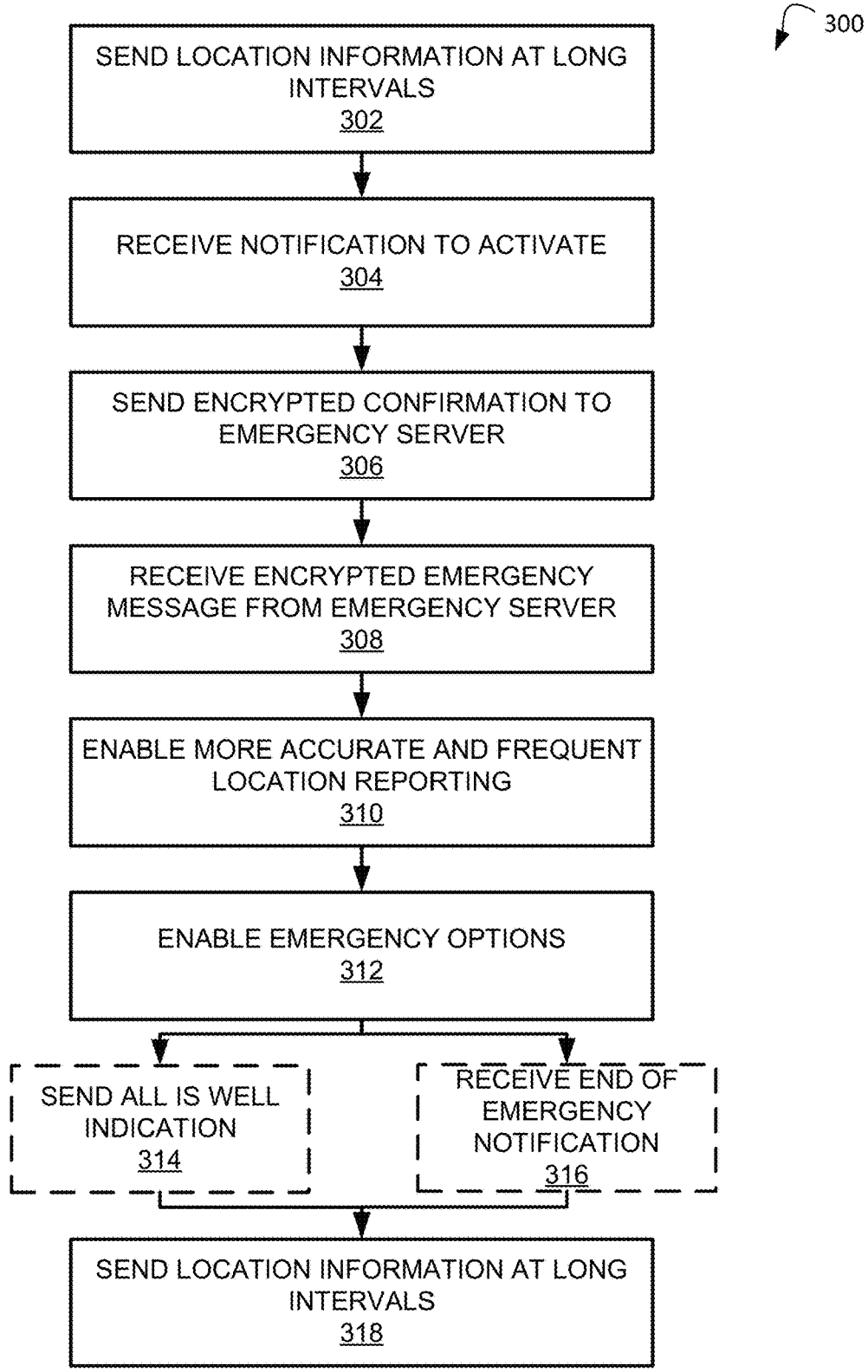
FIG. 3 depicts an example of a method for handling emergency response by a client device.

FIG. 3 depicts a method for handling emergency response by a client device. At operation 302, when the client device is not in an emergency mode, encrypted location information for the client device is sent to the emergency response server at a lower frequency or, in other words, in long intervals. In some examples, the location information is sent in half hour intervals; however, one of skill in the art will appreciate that other intervals may be used without departing from the spirit of this disclosure. At operation 304, the client device then receives a notification, such as a push notification, to activate an application on the device and/or the device itself.

In response to the notification to activate, at operation 306 the client device sends an encrypted confirmation to the emergency response server. The encrypted confirmation confirms that the client device is ready to receive encrypted information from the emergency response server. At operation 308, the client device then receives an encrypted emergency signal or message indicating that the client device is to enter into an emergency situation mode. The client device enters the emergency situation mode, which cause the client device to enable more accurate and more frequent location reporting to the emergency response server in operation 310. In examples, the short intervals are about every three minutes. In other examples, the short intervals are about every thirty seconds. The more frequent and accurate location information is sent to the emergency response server for the duration of the emergency situation. While in the emergency mode, the client device also enables additional emergency options at operation 312, such as enabling an option for the user to respond that all is well.

The end of the emergency situation may be indicated receiving an end of emergency notification at operation 316. For example, when the emergency situation ends, the client device receives an encrypted end of emergency notification at operation 316, which causes the client device to end its emergency situation mode and return to non-emergency mode. After returning to non-emergency mode, the client device returns to reporting location information at longer intervals at operation 318. An all is well indication may also be received from the client device at operation 314. When the all is well indication is received, a color or other representation of the member's location as displayed may change, or in other examples, the client device returns to a non-emergency mode.

Figure 4A:
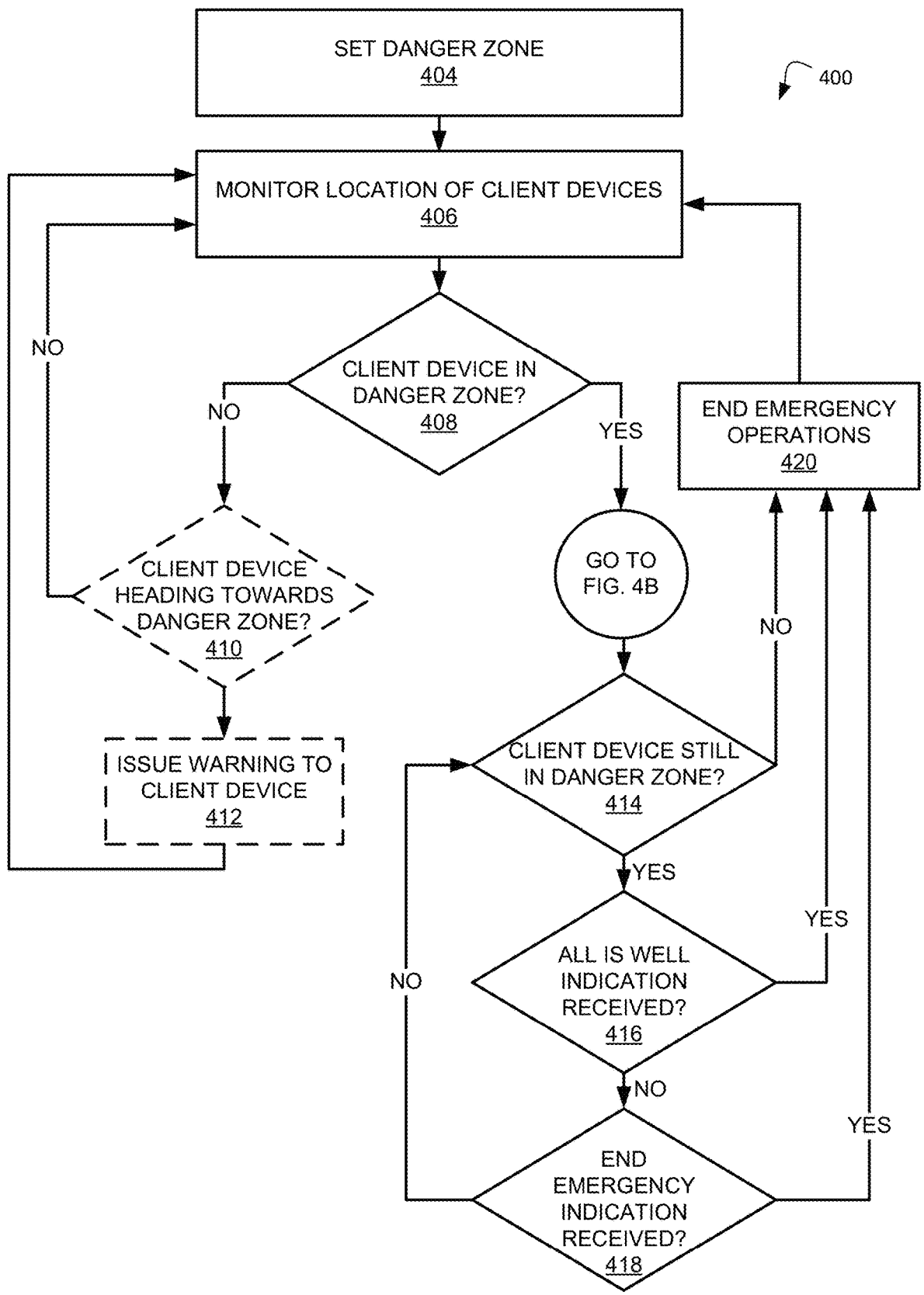
FIG. 4A depicts another example of a method for handling emergency response by a secure emergency response server.

FIG. 4A depicts another example of a method for handling emergency response by a secure emergency response server. At operation 404, the emergency response server sets a danger area that indicates an area affected by an emergency. Setting the danger area zone for an emergency is discussed in further detail below with respect to FIG. 4C. At operation 406, the location of a plurality of client devices is monitored based on the last known location of the respective client devices. As discussed above, the last known location of client devices is stored by the emergency response server.

At operation 408, a determination is made to determine whether one or more client devices are in the danger zone. This determination may be made by comparing the last known location of the client device with the boundary of the danger zone. If the last known location is within the boundary of the danger zone, the client device is determined to be in the danger zone. In further examples, if the client device is not within a boundary of the danger zone a determination may be made as to whether the client is within a threshold proximity of the danger zone. The threshold proximity may dynamically vary based on the type of emergency occurring in the danger zone. For example, some emergencies are capable of spreading faster than others. The threshold proximity set for such emergencies may be greater that the threshold proximity set for other types of slow moving emergencies. Client devices within the threshold proximity may be monitored more closely. For example, such client devices may be instructed to provide location information at a higher frequency.

If the client device is not in the danger zone, in some examples, a determination is made as to whether the client device is heading towards the danger zone. This determination may be made by, prior to overwriting the last known location of the device, comparing it to the most recently received location information that is to overwrite the previously stored location. If the two locations indicate that the client device is on a trajectory towards the danger zone, the client device is determined to be heading towards the danger zone. In examples, the determination of whether the client device is heading towards the danger zone if further based on the proximity of the client device's last known location to the boundary of the danger zone. For instance, if the last known location is within a predetermined distance (e.g., a threshold proximity) from the danger zone boundary and the client device is heading in a trajectory towards the danger zone, the client device is determined to be heading towards the danger zone. In other examples, it may be determined that the client device is heading towards the danger zone based upon a determined transportation mode. For example, if a client device is located far away from the danger zone, it may not matter whether or not the current trajectory of the client device is heading towards the danger zone because there is ample opportunity for the client to change directions. However, it may be possible to determine that the client device is travelling on a transportation system, such as a train, a metro line, or a highway, which leads to the danger zone. Upon identifying that the client device is traversing a transportation system that will eventually travel to or through the danger zone, then that client device may be determined to be heading to the danger zone. Furthermore, in making such a determination, a client device may be determined to be heading to the danger zone even if the current trajectory of the client device is not towards the danger zone. If the client device is not heading towards the danger zone, the process flows back to operation 406. If the client device is heading towards the danger zone, a warning may be issued to the client device at operation 412. In examples, the warning is issued by the emergency response server by first issuing a notification to activate the device, receiving a confirmation from the device, and then sending the warning as an encrypted message, similar to the method described above with reference to FIG. 2. Once the warning has been issued, the process flows back to operation 406.

Figure 4B:
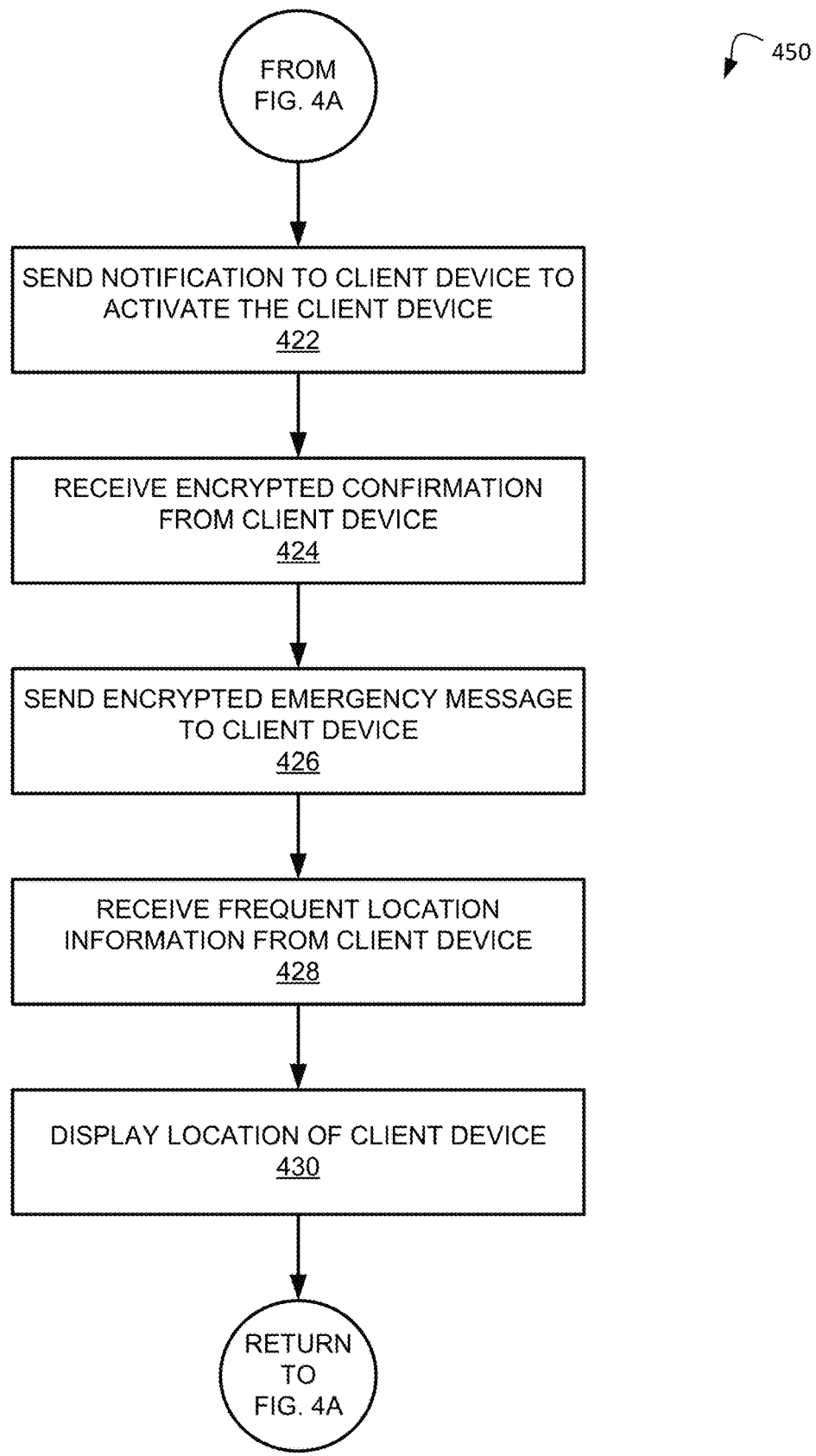
FIG. 4B depicts an example of a portion of a method for handling emergency response by a secure emergency response server.

If the client device is in the danger zone, the operations depicted in FIG. 4B are performed. At operation 422, a notification is sent to the client device to activate the client device. In examples, the emergency server sends a communication to a mobile provider service, such as APNS, which in turn sends a push notification to the client device. At operation 424, the emergency response serve receives an encrypted confirmation from the client device indicating that the client device is ready to receive encrypted communications. At operation 426, an encrypted emergency message is sent to the client device with the details of the emergency. Due to the client device entering an emergency mode, the emergency response server also begins receiving frequent location information from the client device at operation 428.

The emergency response server also causes the display of the location of the client device. The method 450 in FIG. 4B is similar to much of the method depicted in FIG. 2 and discussed above.

Following operation 430, the process flow returns to operation 414 in FIG. 4A. At operation 414, a determination is made as to whether the client device is still in the danger zone. This determination may be made by comparing the location of the client device based on the frequent location information to the boundary of the danger zone. If the client device is no longer in the danger zone, the emergency situation is ended at operation 420 and a message is sent to the client device indicating the end of the emergency situation. In some examples, the emergency situation will not ended for that particular device until the device is no longer in the danger zone, even if an all is well message has been received. If the client device is still in the danger zone, it is determined whether an all is well indication has been received from the client device. If the all is well indication has been received, the emergency situation is ended with respect to that client device at operation 420 and a message is sent to the client device confirming the end of the emergency situation as to that client device. In other embodiments, the emergency situation is not ended upon receipt of an all is well message, but an icon representative of the location of the client device will change color or other features to indicate that the all is well signal has been received. If an all is well indication is not received, a determination is made in operation 418 as to whether an end emergency indication has been received. If the end emergency situation indication has not been received the process flows back to operation 414. If the end emergency situation indication has been received, the emergency situation is ended at operation 420 and a message is sent to the client device indicating the end of the emergency situation. After the emergency operations are ended at operation 420, the process flows back to operation 406.

Figure 4C:
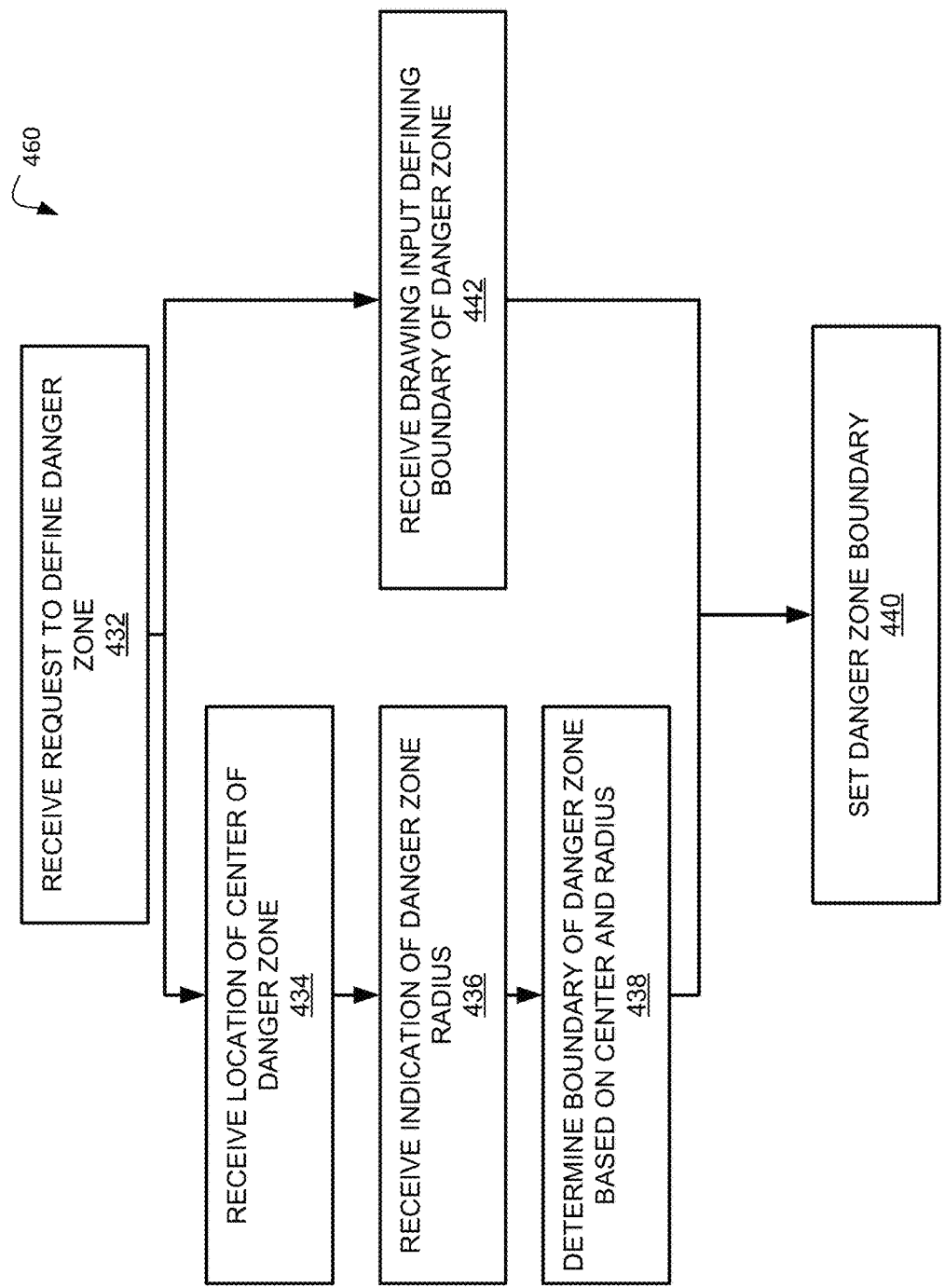
FIG. 4C depicts an example of a method for setting a danger zone boundary for use in handling emergency response.
Figure 12:
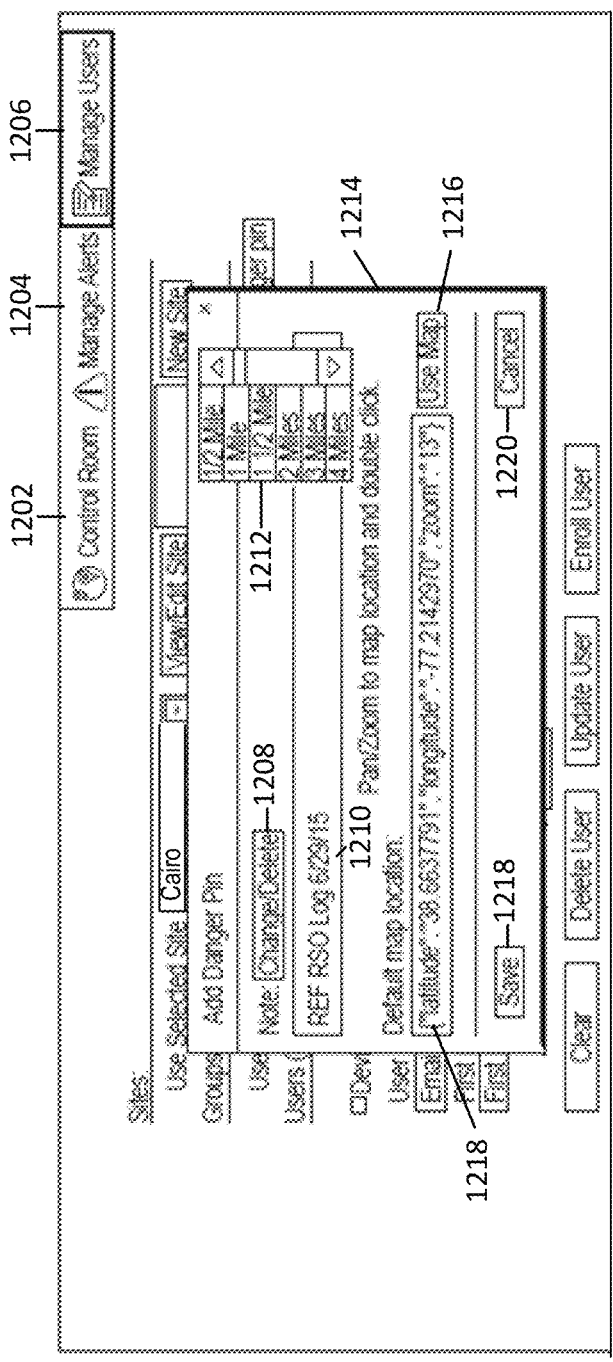
FIG. 12 depicts an example of a user interface for setting a danger zone boundary.
Figure 13:
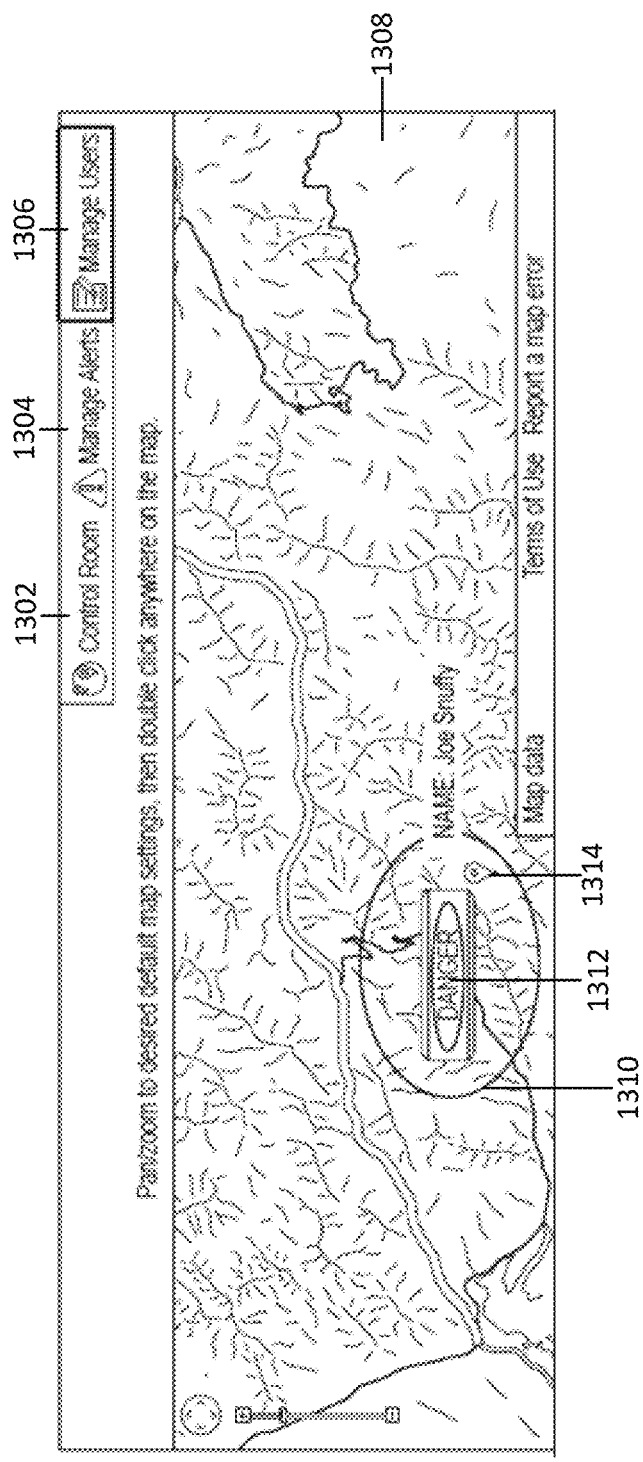
FIG. 13 depicts an example of a user interface for using the danger zone boundary in the emergency response technology.

FIG. 4C depicts an example of a method 460 for setting a danger zone boundary for use in handling emergency response. For example, method 460 is setting a danger zone boundary as part of operation 404 in method 400 depicted in FIG. 4A. At operation 432, a request to define the danger zone is received. In response to the request to define the danger zone, the emergency response server may provide a prompt with options for defining the boundary, as depicted in FIG. 12 and discussed below.

The boundary can be set in a multitude of ways, include defining a location and a radius, or receiving input of defining the boundary. Such input may be in the form of receiving a drawn boundary on an electronic map. In other examples, the boarders of the boundary may be based off coordinates, addresses, geographic regions (e.g., neighborhoods, cities, etc.), or any other data that can be used to define a bounded area. With respect to the location and radius option, at operation 434, a location for the center of the danger zone is received. This may be received by a user dropping a pin on map, entering and address, or otherwise providing coordinates of the location. At operation 436, an indication of the radius of the danger zone is received. Based on the center location of the danger zone received in operation 434 and the radius of the danger zone received in operation 436, a boundary for the danger zone can be determined in operation 438. For example, the boundary of the danger zone may a circle having a center and radius corresponding to the value received. Once the boundary has been determined, the danger zone boundary is set in operation 440. For instance, the boundary may be converted into a form capable of use by the emergency response server. In some examples, the size and shape of the danger zone can be dynamically determined by the emergency response server based on the type of emergency. For instance, a fire may be associated with a half-mile radius, while a riot may be associated with a two-mile radius. Accordingly, the indication of the danger zone radius received in operation 436 may be in the form of a type of emergency. As previously discussed, in further examples, the radius may be automatically determined based upon the type of emergency.

In other examples, the boundary can be determined from drawing input received at operation 442. The drawing input defines the boundary as drawn on a map display. For example, a user of a secure portal device may draw on a displayed map to indicate the boundary of the danger zone. Based on the drawing input, the danger zone boundary is set at operation 440.

Figure 5:
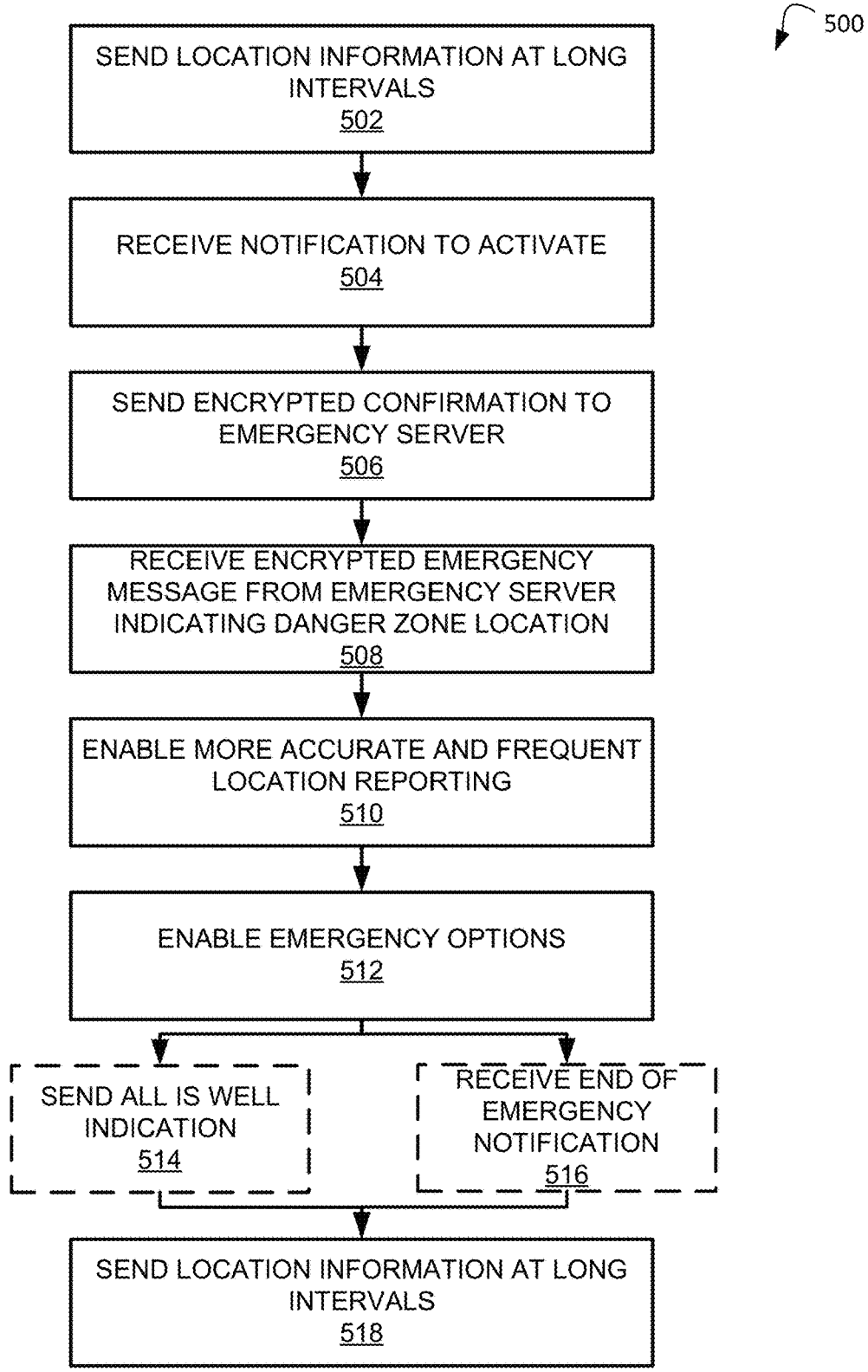
FIG. 5 depicts an example of a method for handling emergency response by a client device.

FIG. 5 depicts an example of a method 500 for handling emergency response by a client device. The elements of method 500 are similar to the elements of method 300 depicted in FIG. 3. At operation 502, when the client device is not in an emergency mode, encrypted location information for the client device is sent to the emergency response server in long intervals. In some examples, the location information is sent in half hour intervals; however, one of skill in the art will appreciate that other intervals may be used without departing from the spirit of this disclosure. At operation 504, the client device then receives a notification, such as a push notification, to activate an application on the device and/or the device itself. The notification may have been generated by the emergency response server based on the client device being in a danger zone.

In response to the notification to activate, at operation 506 the client device sends an encrypted confirmation to the emergency response server. The encrypted confirmation confirms that the client device is ready to receive encrypted information from the emergency response server. At operation 508, the client device then receives an encrypted emergency message indicating that the client device is to enter into an emergency situation mode. The client device enters the emergency situation mode, which cause the client device to enable more accurate and more frequent location reporting to the emergency response server in operation 510. The more frequent and accurate location information is sent to the emergency response server for the duration of the emergency situation. While in the emergency mode, the client device also enables additional emergency options at operation 512, such as enabling an option for the user to respond that all is well.

The end of the emergency situation may be indicated by the client device sending an all is well indication at operation 514 or receiving an end of emergency notification at operation 516. For example, when the emergency situation ends, the client device receives an encrypted end of emergency notification at operation 516, which causes the client device to end its emergency situation mode and return to non-emergency mode. The end of emergency notification may indicate that the client device has left the danger zone. After returning to non-emergency mode, the client device returns to reporting location information at longer intervals at operation 518.

Figure 6:
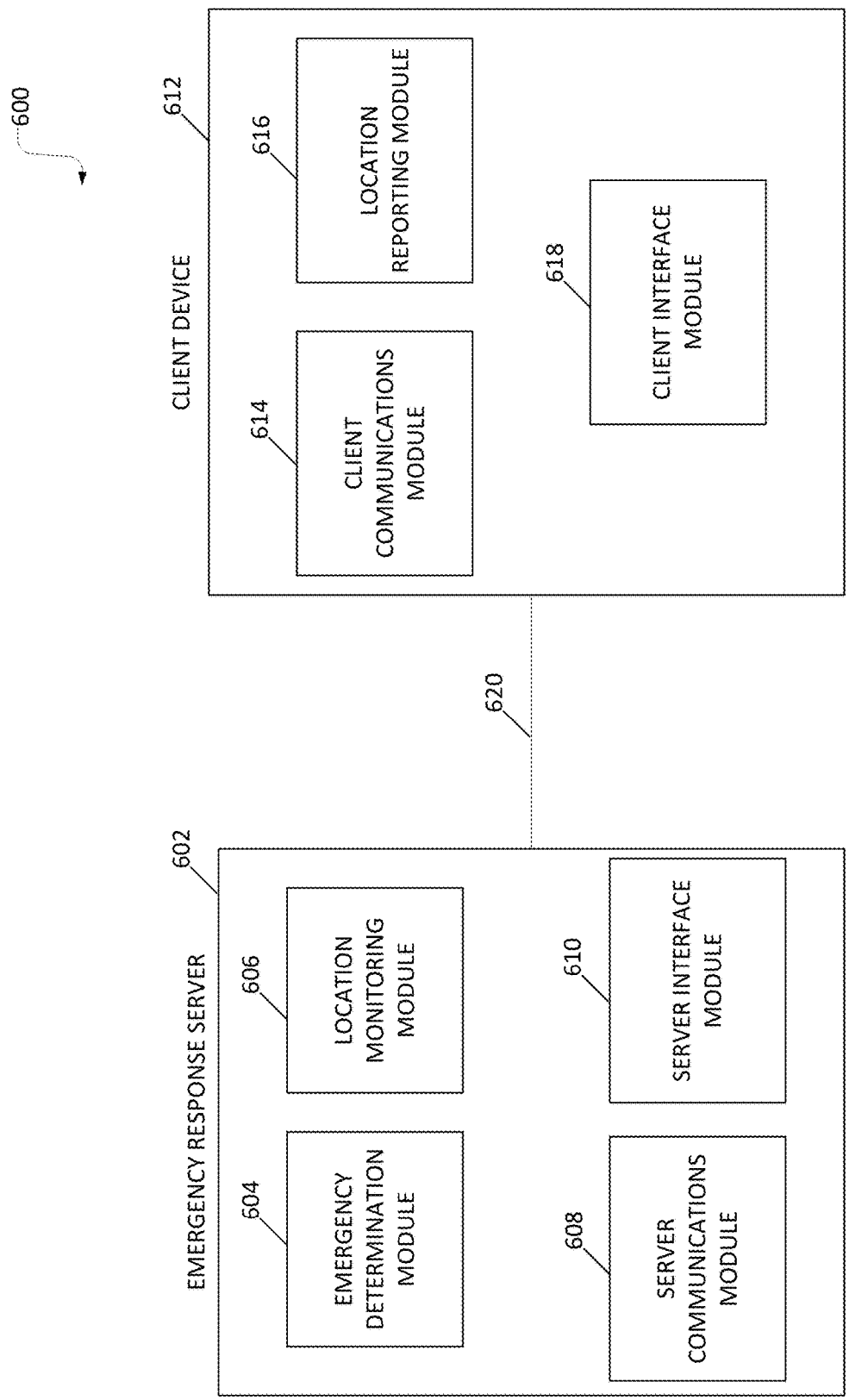
FIG. 6 depicts an example of a system for implementing the secure emergency response technology.

FIG. 6 depicts an example of a system 600 for implementing the secure emergency response technology. System 600 includes an emergency response server 602 and a client device 612. In examples, the emergency response server 602 may be emergency response server 118 and client device 612 may be client device 128.

Emergency response server 604 includes an emergency determination module 604, location monitoring module 606, server communications module 608, and server interface module 610. As used herein, "modules" include hardware, software, or a combination of hardware and software configured to perform the processes and functions described herein. In addition, as used herein, an "application" comprises instructions that, when executed by one or more processors, performs processes and functions described herein. The emergency determination module 604 determines when there is an emergency situation. For instance, the emergency response module 604 performs several operations discussed above, such as receiving an emergency situation indication at operation 204 in FIG. 2 and determining whether a client device is in a danger zone or heading towards a danger zone in operation 408 and operation 410 depicted in FIG. 4A. The emergency determination module 604 may also receive the end emergency indications and all is well indications that indicate that the emergency situations should be ended, at least as to a particular client device. The emergency determination module 604 may also store a state value indicating whether an emergency situation is ongoing along with other information about the emergency. The emergency determination module may also perform many of the operations of method 460 depicted in FIG. 4C.

The emergency determination module 604 works in conjunction with the other modules in the emergency response server 606. For example, the emergency determination module 604 may work with the location monitoring module 606. The location monitoring module 606 performs location-based actions as discussed above. For instance the location monitoring module 606 performs the monitoring location functions described above with reference to operation 406 depicted in FIG. 4A above. The location monitoring module 606 is also responsible for receiving and storing the last known location of the client device when received. The location monitoring module 606 also implements the location storage policies, such as only storing the last known location and purging all location information 72 hours after the end of an emergency situation.

The server communications module 606 handles the communication between the server 602 and client device 612 as well as the communication between the server and any secure portal devices, such as the portal devices discussed with respect to FIG. 1, above. The communication between the server 602 and the client device 612 is accomplished via connection 620, which may be a wired or wireless connection and include communications based on the internet, cellular networks, or other communication methods. For example, the server communications module 608 sends notifications and encrypted messages to the server as described above with reference to FIGS. 2, 4A, and 4B. In some examples, the server communications module encrypts the outgoing communications and decrypts the incoming communications.

The server interface module 610 handles the user interfaces displayed by the server 602 or equivalently through a portal on a secure portal device. For example, the server interface module 610 controls the display of the location of the client device based on information from the emergency determination module 604 and the location monitoring module 606, as described in operations depicted in FIGS. 2, 4A, and 4B. The server interface module 610, for instance, also controls the interfaces discussed below with reference to FIGS. 7-13.

The client device 612 includes a client communications module 614, a location reporting module 616, and a client interface module 618. The client communications module 614 handles the communication between the client device 612 and the server 602. For example, the client communications module receives from the server 602 and sends to the server 602 the encrypted messages, such as described above with respect to FIGS. 3 and 5. In some examples, the client communications module encrypts and decrypts the messages.

The location reporting module 616 reports the location of the client device 612 to the client communications module 614 for sending the location information to the server 602 in an encrypted manner. The location reporting module determines the location of the device based on signals from a global positioning component on the client device 612 or through triangulation based on cellular signals and cellular tower locations. In embodiments the location is determined through other methods, such as assisted GPS (aGPS) and through Wi-Fi network location information, among other techniques known by those having skill in the art. The location reporting module also switches between long interval location reporting and frequent location reporting based on whether the client device is in an emergency mode or not. For instance, when the client device switches from a non-emergency mode to an emergency mode, the location reporting module enables more frequent location reporting and, in some examples, more accurate location reporting, as described above with reference to operations in FIGS. 3 and 5. The more accurate location reporting may be achieved by modifying the requested accuracy from the GPS components or switching from a broad location determination process, such as Wi-Fi network location, to a more accurate process, such as aGPS.

The client interface module 618 provides the user interfaces for the client device 612, such as the user interface discussed below with reference to FIG. 14. The client interface module 618 also receives input from the user such as an "SOS" message or an all is well message, along with messages that the user inputs to send to the emergency response server 602. The client interface module 618 also performs operations to enable particular features, such as the all is well button, when the client device 602 is an emergency mode.

Figure 7:
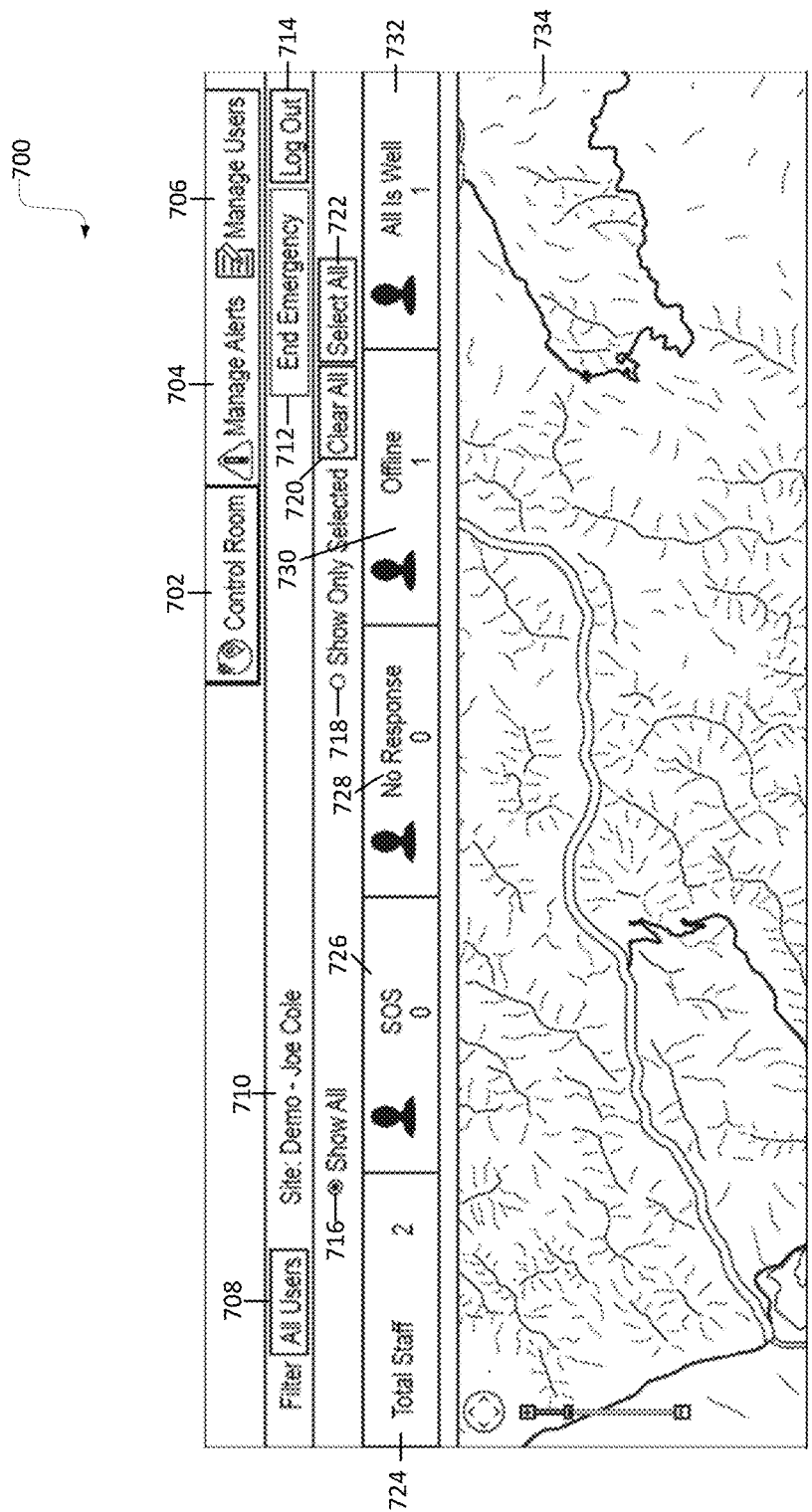
FIG. 7 depicts an example of a control room user interface for use in the emergency response technology.

FIG. 7 depicts an example user interface 700 for the portal of a security user accessing the server, such as through a secure portal device. The general interface of user interface 700 may be referred to herein as the "Control Room" interface, as indicated by the control room interface option 702 being selected. The control room interface includes a map 734 of a location along with information on members registered with the emergency response server having registered client devices. A default map location can be chosen or set to go to the last location viewed. Above the map, indicators are displayed for the total number of people associated with that portal and the status of the users. As shown, there is a total members indicator 724 indicating the total number of members being monitored, an SOS indicator 726 indicating the number of members that have issued an SOS message that has not yet been ended, a no response indicator 728 indicating the number of members that have not responded to an emergency situation message, an offline indicator 730 indicating the number of members that whose client device is currently offline, and an all is well indicator 732 that displays the number of members that have indicated all is well. Each of the indicators 726, 728, 730, 732 include an icon that may be a different color or shape to indicate the different statuses associated with the different indicators 726, 728, 730, 732. For instance, as shown in FIG. 7, there are a total of two members reflected in the total members indicator 724. The two members are assigned to the "Demo-Joe Cole" portal as indicated by the site indicator 710, and the number in the total member indicator 724 reflects the total number of members assigned to that particular emergency management portal. When there is no emergency situation for a user, group, or all users of a particular portal, no location data will appear on the map in order to protect the privacy of the users. For instance, as shown in FIG. 7, one user is offline and the other has responded all is well, so there is no location information displayed for those users. Once an emergency situation is declared, the location for group members determined to be potentially affected by the emergency is displayed. Additionally, if any user sends an SOS signal from the their client device, the location of only that client device will be displayed on the map, regardless of whether an emergency situation has been declared.

The control room interface also includes additional features and options. For instance, a filter option 708 can be used to select subgroups of members assigned to the current portal. The filter option may also be used to select from different statuses of members, such as members that have provided an SOS, no response, or an all is well response. Additionally, the control interface includes options to choses which users to display when there is an emergency situation. The show all option 716 may be selected to display all members assigned to the particular portal when there is an emergency situation. Otherwise, the show only selected option 718 may be selected to display only the members associated with one or more of the indicators 726, 728, 730, 732 that have been selected. The selections of the indicators 726, 728, 730, 732 may be cleared by selecting the clear all option 720. Conversely, all the indicators 726, 728, 730, 732 may be selected by selecting the select all option 722.

As another option, a user may select the end emergency option 712, which causes the emergency to end. Upon selection of the end emergency option 712, any current emergency will be ended and a message will be sent to the client devices affected by the emergency, as discussed above. The end emergency message will cause the client device to end its emergency mode. Selection of the end emergency option 712 also causes the location of all client devices to no longer be displayed. A log out option 714 is also presented allowing a security user to log out of the portal session.

Also presented are a manage alerts indicator 704 and a manage users indicator 706. Each indicator can be selected to retrieve another interface, such as a manage alerts interface shown in FIG. 10 or the manage users interface shown in FIG. 11.

Figure 8:
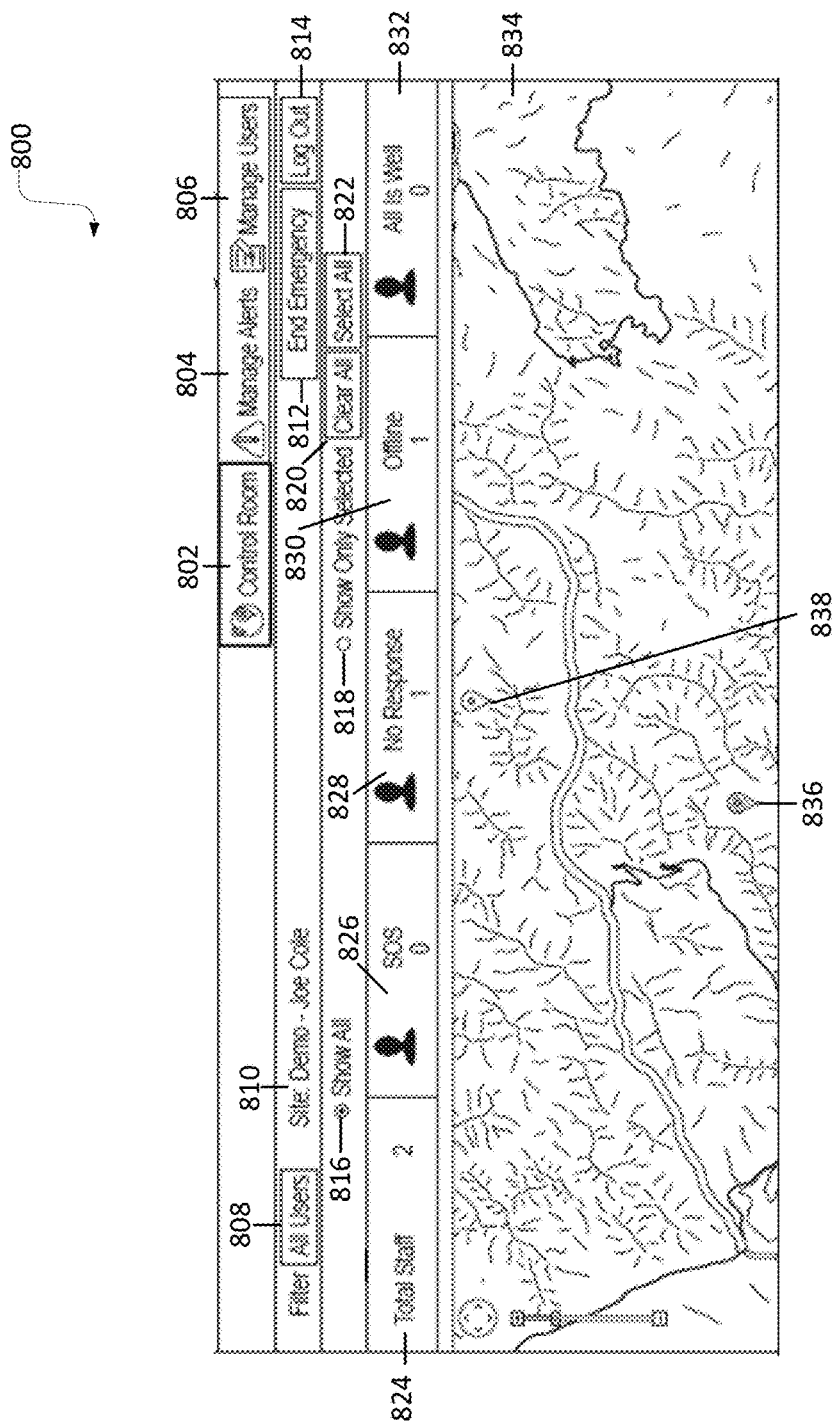
FIG. 8 depicts another example of a control room user interface for use in the emergency response technology.

FIG. 8 depicts an example of a control room interface 800 during an emergency situation. Much of the interface 800 provides the same features and options as interface 700 in FIG. 7, and such common features have been identified with similar reference numerals. When an emergency alert is issued, the control room interface 800 then includes the location of the users to which the alert was sent. As shown in FIG. 8, a first client device location indicator 836 and a second client device location indicator 838 are displayed on the map 834. Each member's location may be displayed in a different manner, such as different colored pins, depending on the member's respective status. For instance, members that have responded all is well are displayed in green, members that have sent an SOS signal are displayed in red, members that have not responded, but whose devices are still communicating with the emergency response server, are displayed in yellow, and members that are offline (e.g., the member's client device is turned off or not otherwise in communication with the emergency response server) are displayed in grey. As depicted in FIG. 8, one member has not yet responded and the location indicator 838 corresponding to the user is displayed as a white pin. In examples, the location indicator 838 would have the same color or pattern as its respective status indicator. For instance, the icon for the no response status indicator 828 would have the same color or pattern as all client device location indicators on the map 834 corresponding to users that have provided no response. As also shown in FIG. 8, another member's client device is offline so that member's last known location is displayed on the map as location indicator 838 with a hashed pattern. Similar to the interface in FIG. 7, within the control room interface 800, an end emergency option 812 is presented that, when selected, will cause the emergency situation to end, remove all user location pins from view, and deny access to the location data.

Figure 9:
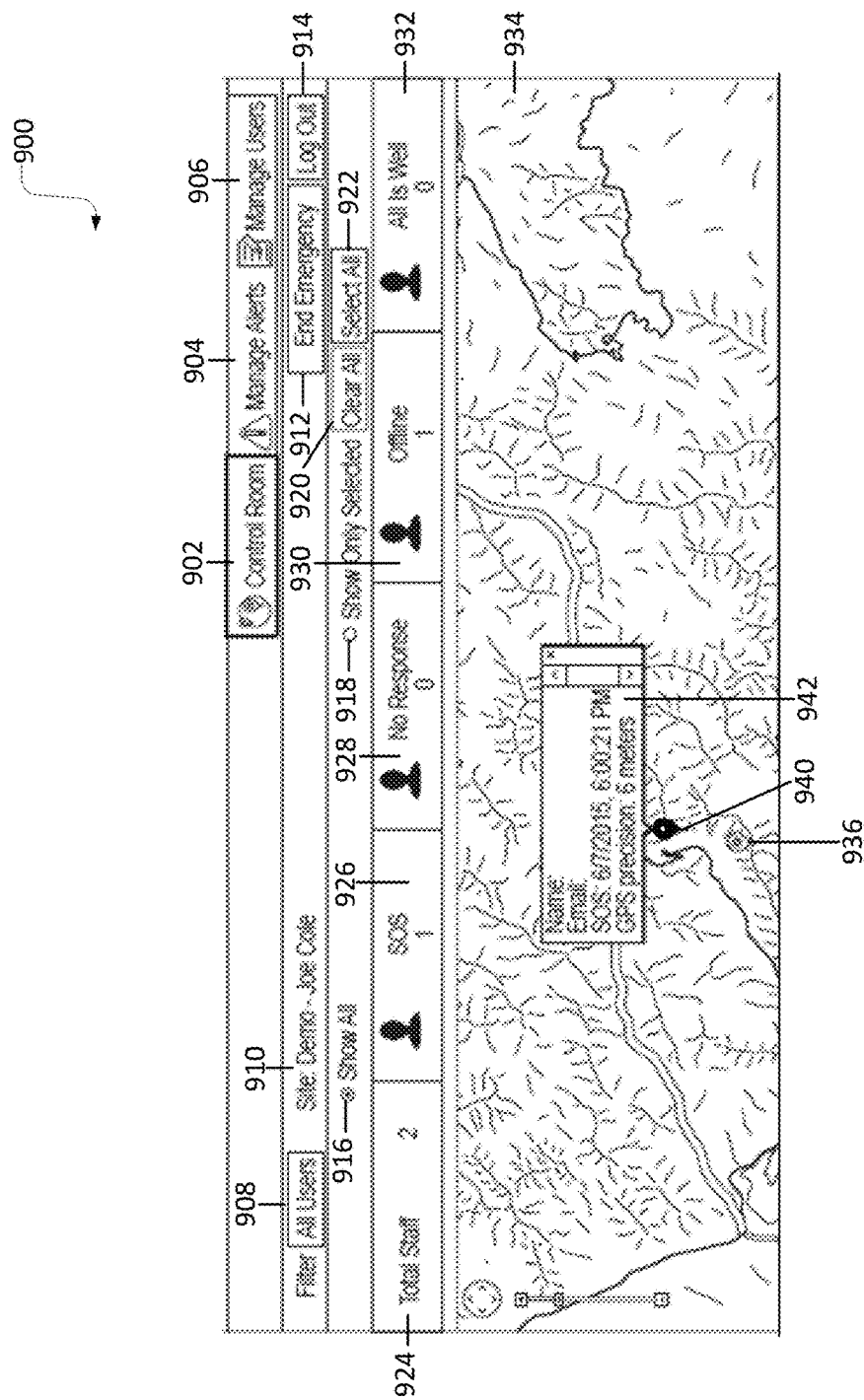
FIG. 9 depicts yet another example of a control room user interface for use in the emergency response technology.

FIG. 9 depicts an example of the control room interface 900 that is presented when a member sends an SOS message. The control interface 900 is similar to control interface 700 in FIG. 7 and control interface 800 in FIG. 8, and similar items have been identified with similar reference numerals. When the SOS message is received by the emergency response server, the location of the member's client device is displayed on the map 934, as shown by location indicator 940. Further, the SOS status indicator 926 is updated to reflect that there is a member that has sent an SOS message. In addition to the interface features shown in FIG. 9, a message may also be displayed indicating that the SOS message has been received from the user. The message may also include an option to acknowledge the receipt of the SOS message and an option to pan/zoom directly to the client device's location on the map 934 in the control room interface 900. A siren may also be sounded to alert a security user that a member has sent an SOS.

Upon selection of the location indicator 938, the map may zoom to the user's location and provide details about the member, such as the member's name, login, e-mail address as shown in the information box 940. The date and time of the SOS and last time the location data was received by the emergency server is also displayed in information box 940. The location information will be received at more frequent intervals than when the member's client device was not in an emergency mode. For instance, in some examples the location data will now update every 30 seconds while in emergency mode versus 30 min intervals during non-emergency status. In order to assist emergency responders in finding the member, the client device sends the most accurate information possible. In examples, the client device sends its most accurate location data based on the order of precedent of: GPS, Wi-Fi, cell tower triangulation, and a single cell tower. Even if the member has disabled location services or no accurate location can be established for any reason, the member is still able to send and receive messages.

If the member receives assistance or otherwise is no longer in need of assistance, the member selects the all is well button on the client device, which sends an all is well message to the emergency response server. Once the all is well message is received by the emergency response server, the control room interface is updated to reflect the change in status for the user. For instance, the color of the location indicator for the member may be turned from red to green. In some examples, additional information about the member is still displayed, and the member's position continues to be displayed until the emergency situation is ended.

Once the security user selects the end emergency option, the emergency situation is ended, and the Control Room interface is returned to non-emergency mode and all location indicators and data are removed and cannot be accessed by even the security user unless emergency mode is turned back on by sending an alert which automatically notifies users their location is visible and being tracked.

Figure 10:
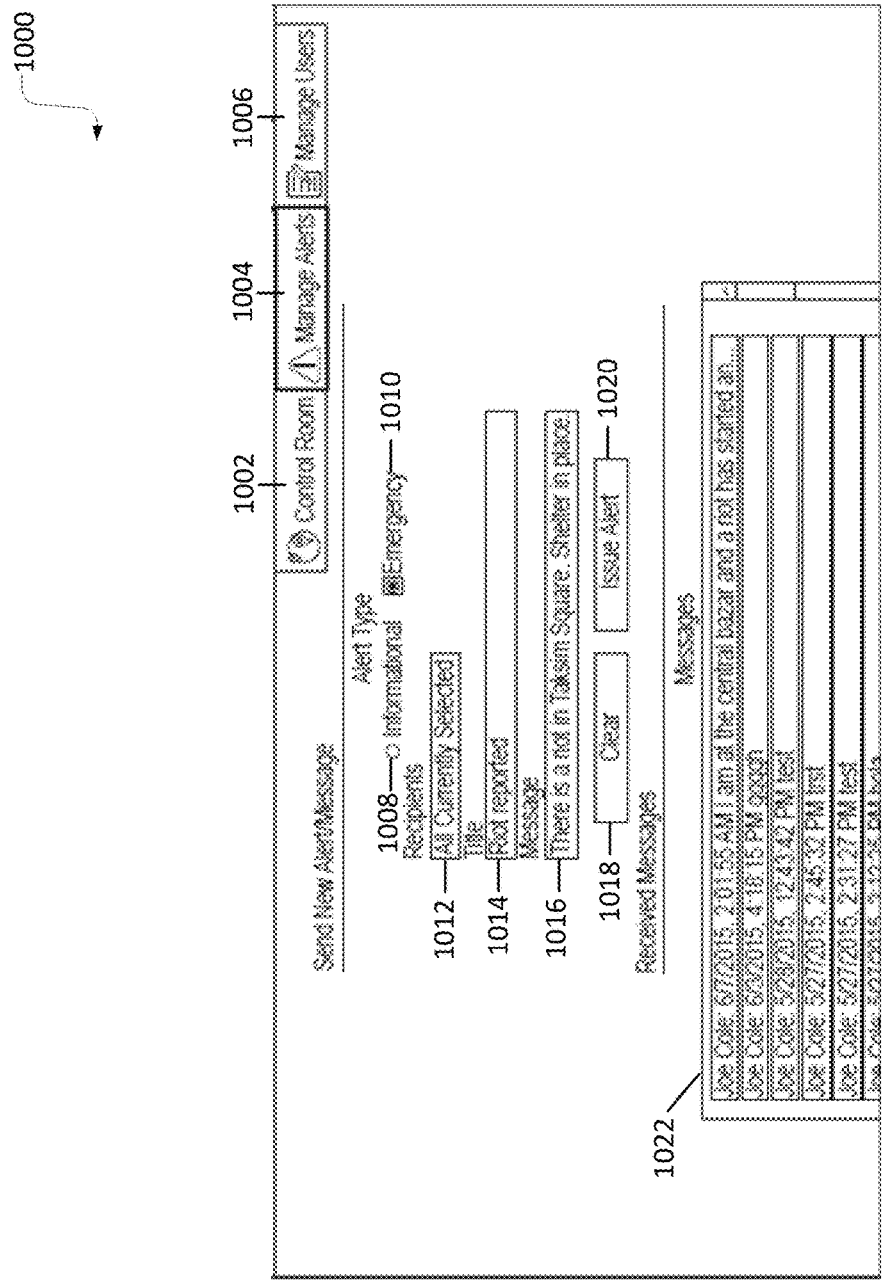
FIG. 10 depicts an example of a manage alerts user interface for use in the emergency response technology.

FIG. 10 depicts a user interface 1000 presented by the emergency response server to a security user accessing the server from a secure portal device. The user interface 1000 depicted in FIG. 10 may be referred to as the Manage Alerts interface, as indicated by the manage alerts indicator 1004. From the Manage Alerts interface 1000, an alert is able to be generated. The alert may either be informational or an emergency alert and a type of alert may be made by receiving a selection of the informational option 1008 or the emergency option 1010. An informational alert does not trigger the system to enter emergency mode and display the location of client devices, whereas an emergency alert triggers initiation of emergency mode and instantly displays on the map all client device locations to which the alert was sent. The recipients of the alerts may also be selected as individuals, groups of individuals, or all groups and users assigned to that emergency portal. Selection of the recipients can be made from the recipient input option 1012. Additional input options are presented to define the title (title input option 1014) and the body of the message of the alert (message input option 1016). An issue alert option 1020 is also provided to issue the alert when selected. A clear option 1018 is also presented to clear the information that was input into the input options 1012, 104, 1016. In the example of the Manage Alerts interface shown in FIG. 10, messages received from group members are also displayed to assist in generating alerts.

Once the issue alert option is selected, the emergency response server issues the alert as configured. If the alert is successful, confirmation of alert message may be displayed within the interface 1000. The confirmation of alert message may also indicate how many users to which the alert was sent. In some examples, the names of the users and/or the associated group or groups that a user belongs to may also be displayed in the confirmation of alert message. In further examples, the confirmation of the alert will indicate how many messages were sent through the mobile application and how many were sent via SMS.

A response to the member that issued the SOS message may be made through the Manage Alerts interface shown in FIG. 10. A selection of a user may be selected to send a message, such as "help is on the way" to the let the member know that help is on the way. The message may also provide instructions and expectations such as "shelter in place or move to 16th and Elm drive for pick up". In examples, when a message is received from a client device, the message is displayed in a pop up window that displays who the message came from and the contents of the message. In further examples, the message may also indicate whether the message was sent through unsecure SMS or through the encrypted mobile application. Multiple options may also be presented in the pop-up window. In examples, an okay option is presented to acknowledge receipt of the message, a show user option is available to show the member's location on a map if in emergency mode, and a reply to member option is presented to send a reply message to the member.

Figure 11:
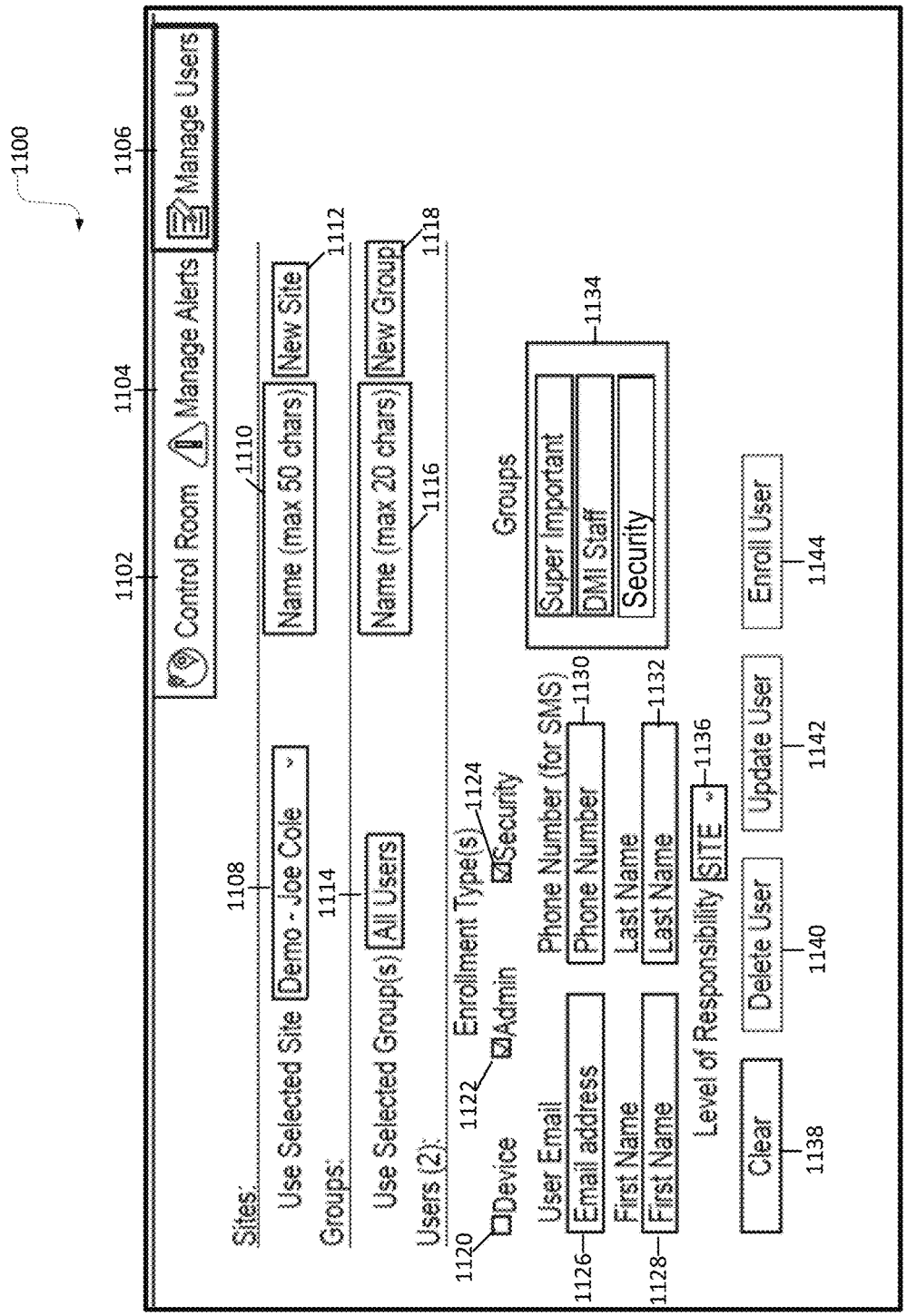
FIG. 11 depicts an example of a manage users user interface for use in the emergency response technology.

FIG. 11 depicts a user interface 1100 controlled by the emergency response server and presented to a security user using a secure portal device. The interface 1100 may be referred to herein as the manage users interface 1100 as indicated by the manage users indicator 1106 being selected. One function accessible through the portal is the ability to establish groups to better manage communications and alerts during an emergency. That functionality can be achieved through the manage users interface 1106. Groups have the intended purpose of providing an organized means of managing both emergency alerts and routine communications by allowing targeted alerts or messages to be sent and received to all users, only those belonging to a particular group such as "all campus students" or "all campus faculty," as well as to individual users. A particular site can be selected via the selected site option 1108. Each particular site may have a set of groups assigned to it that may then be selected from the use selected groups option 1114. Alternatively, a new site can be created by entering the name of the new site in the site input box 1110 and selecting the new site option 1112. Existing groups can be selected and modified by selecting the group from the selected groups option 1114, or a new group can be created by entering the name of the group in the group name input box 1116 and selecting the new group option 1118. Once a new group is created, users can be added to each group or moved between. Each user group may also be assigned enrollment types which correspond to different access levels and functional rights. The user may be designated as a "device" user, which is generally a user of a client device that may be a potential victim in an emergency situation. The "device" user is able to send and receive encrypted SOS requests for assistance in an emergency via a one click action and send/receive encrypted messages via a client device's messaging function, but the "device" user has no portal access. The user may also be assigned as an "admin" user, which provides access to the portal to manage users and groups, but does not provide access to location data received from client devices. "Admin" users also do not have the ability to issue emergency notifications, alerts, and messages. This allows the delegation of the administrative function to a person which does not have a perquisite such as a background investigation needed for accessing personal privacy or sensitive information. An example of an Admin user is a US Government office working overseas and using local employees for administrative functions who would not be granted access to see location data of government officials. The user may also be designated as a "security" user, which provides portal access having the ability to send and receive secure emergency notifications, alerts, and messages. The "security" user also has access to the location data of potential victims during emergency situations when the portal is put in emergency mode. A user can be assigned any combination of these access levels. The access levels may be assigned by checking one or more of the device check box 1120, the admin check box 1122, and the security check box 1124. In other examples, a user may be designated to have "Command Access" in which a single login may access multiple portals. For instance, for country-wide crises, a particular user may need to have access to the portals of multiple entities. In further examples, there may also exist an additional enrollment type of "SMS/Non-Mobile App User", to indicate that the member may not have the application, but still requires notifications through SMS technology.

In enrolling or updating a user, the e-mail address, phone number, first name, and last name can be entered in the manage users interface 1100. For example, the respective information may be entered in the e-mail input box 1126, the phone number input box 1130, the first name input box 1128, and the last name input box 1132. A pseudonym can be used in place of real names for VIP's or sensitive operations and generic email addresses. A telephone number may be optional. As also shown in FIG. 11, a level of responsibility may also be set via the level of responsibility option 1136. The level of responsibility provides another level of control that a user may be assigned. A listing of groups currently assigned to the selected site may also be displayed in group display box 1134. Selection options are also providing for finalizing the updating, enrollment, or deletion of a user by the delete user option 1140, the update user option 1142, and the enroll user option 1144.

FIG. 12 depicts a user interface 1200 for setting the boundary of a danger zone. When a selection of the set danger zone boundary option is received, a pop-up display 1214 is displayed providing a set of options for setting a danger zone boundary. As one aspect of the emergency response technology, the danger zone boundary may be considered a geo-fence, and when the client device crosses the geo-fence, the client device enters an emergency situation mode, as discussed above. The interface in FIG. 12 allows a danger pin to be added to a map via a selection of the user map option 1216. If the use map option is selected, a map interface is displayed, such as the map 1308 displayed in FIG. 13. The map may be scrolled, panned, or zoomed until the desired location for the danger pin is identified. A location for the danger pin 1312 may be identified by providing input to the interface, such as by receiving a double click on a particular location on the map or receiving a direct entry of coordinates. When the user indicates the location for the danger pin, the danger pin 1312 is displayed in that location of the map. The danger zone boundary 1310 may also be displayed. If there are any client devices currently in an emergency mode, the location of those devices and the name of the member may also be displayed, as shown by location indicator 1314. A similar danger zone pin 1312 and boundary 1310 may be displayed in a control room interface, such as those shown in FIGS. 7-9, such that the security user can monitor members relative to the danger zone.

Returning to FIG. 12, the location for the center of the danger zone may also be directly entered into the danger zone center input box 1218. The location of the danger zone center may be in the form of coordinates, an address, or other location-based identifiers. The radius of the danger zone may also be set through the radius selection box 1212. The size of the danger zone and the boundary can then be set once the center of the danger zone and the radius of the danger zone have been entered. Notes about the danger pin may also be added in the danger zone notes input box 1210 in conjunction with the change/delete option 1208.

In some examples, the size and boundary of the danger zone may be dynamically determined based on the type of event. For instance, the danger zone boundary surrounding a riot may have a larger area than a boundary surrounding a fire. In such examples, the address or location of the center of the emergency, such as the location of the fire or riot, may be entered, and then the type of emergency may be selected or determined based on the emergency situation information issued. The boundary then may be automatically set based on predetermined sizes for the corresponding emergency events.

In other examples, the size and shape of the danger zone need not be defined by a circle having a particular radius. The danger zone may be defined by any number of shapes and dimensions via a free-hand draw method. In addition, a danger zone may also be drawn directly on the map through the use of an input device or a touch screen. Once the danger zone boundary information has been sent, the save option 1218 may be selected to save the boundary information, or the action may be canceled by selecting the cancel button 1220.

When a member with a registered client device crosses the boundary of the danger zone, the client device automatically enters an emergency situation or SOS mode. When the client device enters the emergency situation or SOS mode, the location information for the client device becomes visible to a security user using the portal, as discussed above. The client device also alerts the member that he or she is likely in danger and a security user can view the member's location. Once the emergency response server receives an all is well signal or the member leaves the danger zone, the emergency situation or SOS mode is automatically ended. In some examples, the client device will remain in SOS mode for as long as the client device is in the danger zone, even if an all is okay signal is received.

Figure 14:
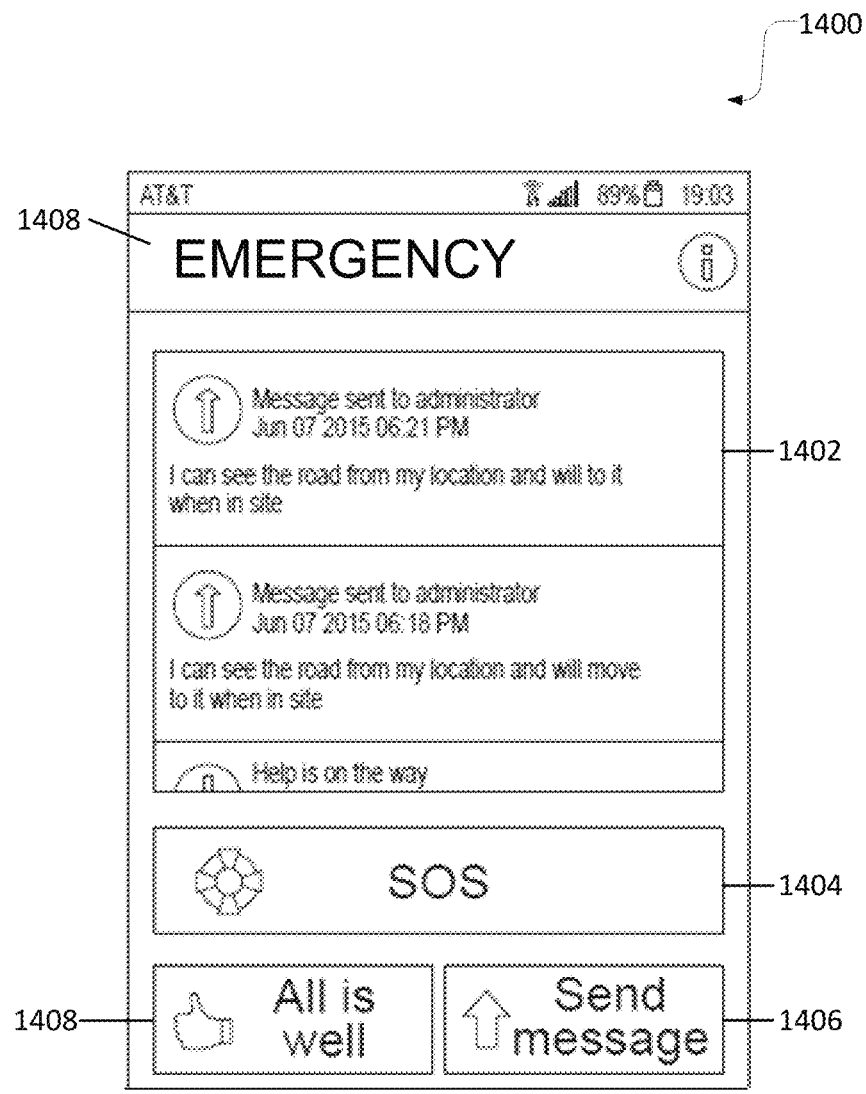
FIG. 14 depicts an example of a client device user interface for use in the emergency response technology.

FIG. 14 depicts a user interface 1400 on a client device for use with the emergency response technology. The interface 1400 includes an emergency banner 1408 that changes depending on whether the client device is in an emergency mode or a non-emergency mode. As indicated in the emergency banner 1408 by the "EMERGENCY" status, the client device depicted in FIG. 14 is currently in an emergency mode. While in the emergency mode, the banner 1408 may also change colors. For instance, the banner may turn red when the device is in an emergency mode. Additional pop-up messages along with audible and tactile alerts may also alert the member when the client device enters the emergency mode. The indication of an emergency situation may not only alert the member that an emergency is occurring, but also that the member's location is being tracked and displayed to a user with security rights. When the emergency situation notification is received, the client device may also sound a unique sound to differentiate it from common notifications the device may normally use for email and other messages such as a siren sounds to further alert the user.

Within the interface 1400, the most recent messages sent or received are also displayed in the messages window 1402. Indicators next to the messages may indicate the type of message, e.g., sent, received, or indicating an emergency. In non-emergency modes, the SOS option 1404 option and the send message options 1406 are presented to allow a member to send an SOS signal or any other type of message. For example, when the SOS option 1404 is selected, an SOS message may be automatically sent to the emergency response server. In some examples, when the SOS option 1404 is selected, there is a delay prior to the SOS message being sent to the emergency response server. The delay allows for the confirmation or cancellation the SOS request to be received in the event it was selected by mistake. In some examples, the delay may be approximately 10 seconds. During the delay, an interface displays a countdown along with options to cancel the SOS or send the SOS signal immediately. In some cases if the SOS message is neither confirmed or canceled within the preset timeframe it will automatically be sent to the emergency response server in the event the user became incapacitated before they could confirm.

When the client device enters an emergency mode, the SOS option 1404 and the send message options continue to be presented. In addition, an all is well option 1408 is also presented. When the all is well option 1408 is selected, causes a message to be sent to the emergency response server that indicates that the user is okay and does not require assistance allowing accountability in managing crises of multiple users. All communications and messages sent from the client device are encrypted.

Upon receiving an alert from the emergency response server, the interface 1400 displays the contents of the alert. The displayed alerts are sorted with the most recent alert shown first. In examples, the alert or message may be of an informational nature and thus not cause the device to enter the emergency mode. Where the application is operating in a background mode, a push notification is first received to wake the application in order to communicate with the emergency response server via encrypted messages. Even when the application is operating in a background mode, a splash screen is utilized to prevent any information previously or currently displayed on the screen from being cached to local device memory.

If the message from the emergency response server is an emergency-type message, the emergency alert is indicated by red exclamation point, or other similar feature, and the banner 1408 changes to a red color and displays "PLEASE RESPOND" to indicate that the user needs to respond with an update to his or her status. A message may then be sent in response, or the SOS option 1404 or the all is well option 1408 may be selected. When the message from the client device is received at the emergency response server, a pop-up message confirming the receipt may be displayed.

Enrollment of a member to use the emergency response technology through a client device is also a secured process. In examples, enrollment of a device begins with a request from an emergency response administrator. Once the administrator requests that a new device be enrolled, an e-mail is auto generated to an e-mail account associated with the user of the new device, such as the e-mail address of a new member. From within the e-mail message, a new member may select a link to download an application that enables the client device functionality discussed herein. An enrollment key is also provided in the e-mail that is needed to enroll the device adding the additional layer of security by association of the device, user login/password, and emergency portal. A user can also download the app directly and manually enter the information contained in the email without needing to receive the email on the device. Once the application is installed on the client device, an interface may be displayed on the client device allowing the user to register the device. The interface presents an input box for the e-mail address, or user name as configured of the new member and for the enrollment key received in the e-mail. Jailbreak detection and other such technology for Android, BlackBerry and other types of mobile devices may also be implemented to prevent jailbroken devices from accessing the application's data. In examples, authentication may also be device specific such that a member would need a new enrollment key for each device. By requiring an enrollment key for each device, an unauthorized user cannot use stolen usernames and passwords to access the emergency response technology from an unknown device. Further, client devices may be disassociated remotely via a connection to the emergency portal from any authenticated device with a valid user from any location in the world if the client device is lost or stolen.

In some examples, the client device will request access to use location information via a pop up box when the application is first launched. An indication may then be received that allows or denies the application to have access to the client device's location. When the application is first launched, a welcome message may also be displayed explaining the functionality of the application.

Figure 15:
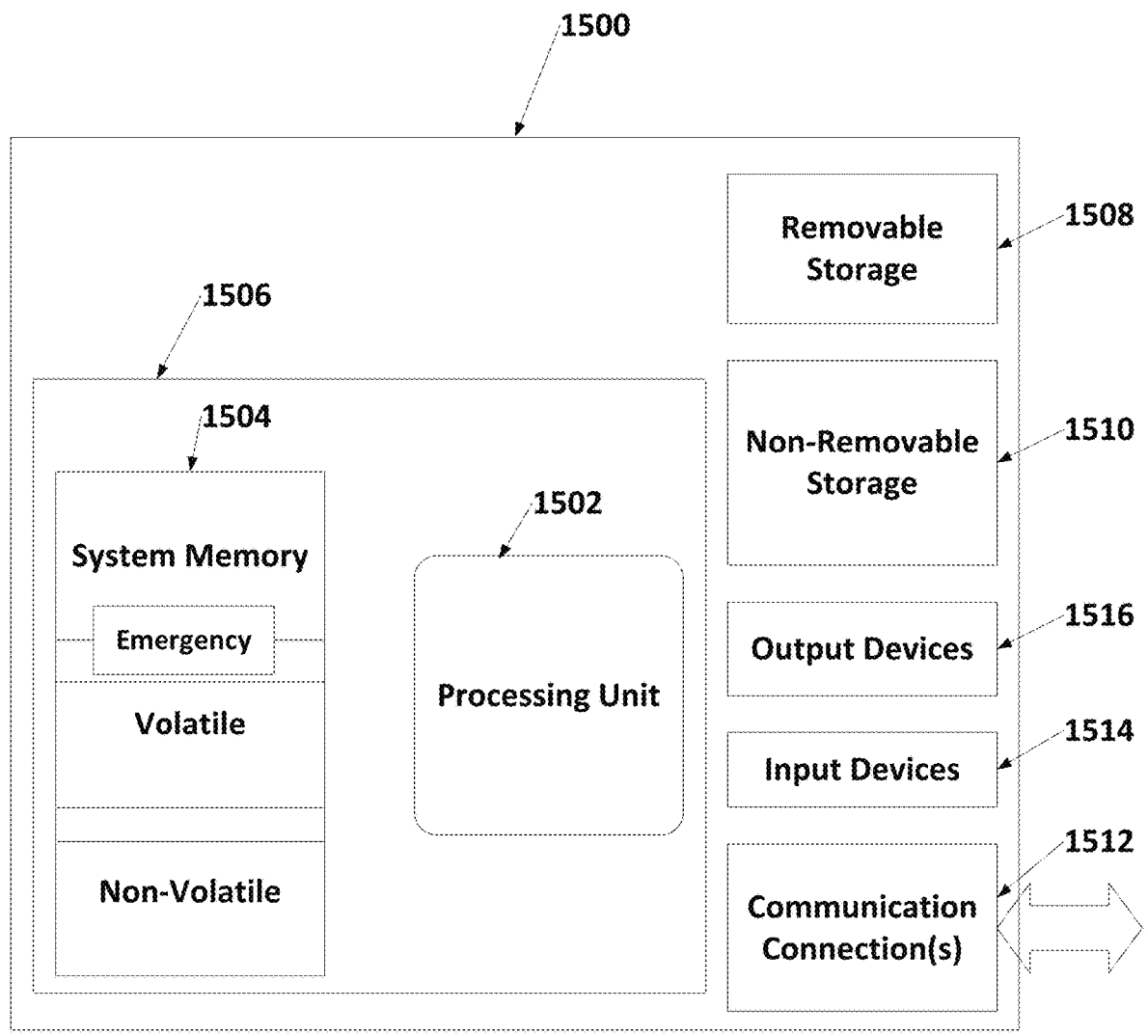
FIG. 15 depicts an example of a suitable operating environment in which the emergency response technology may be implemented.

FIG. 15 illustrates one example of a suitable operating environment 1500 in which one or more of the present examples may be implemented. This is only one example of a suitable operating environment and is not intended to suggest any limitation as to the scope of use or functionality. Other computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, operating environment 1500 typically includes at least one processing unit 1502 and memory 1504. Depending on the exact configuration and type of computing device, memory 1504 (storing, among other things, sequential chains constructed as described herein) may be volatile (such as RAM), non-volatile (such as ROM, flash memory, etc.), or some combination of the two. Memory 1504 may store computer instructions related to handling emergency response situations, managing multi-video and single-video feeds, displaying video data, setting and operating dynamic geofences, and/or displaying the various user interface examples disclosed herein. Memory 1504 may also store computer-executable instructions that may be executed by the processing unit 1502 to perform the methods disclosed herein.

This most basic configuration is illustrated in FIG. 15 by dashed line 1506. Further, environment 1500 may also include storage devices (removable, 1508, and/or non-removable, 1510) including, but not limited to, magnetic or optical disks or tape. Similarly, environment 1500 may also have input device(s) 1514 such as keyboard, mouse, pen, voice input, etc. and/or output device(s) 1516 such as a display, speakers, printer, etc. Also included in the environment may be one or more communication connections, 1512, such as LAN, WAN, point to point, WiFi, Satellite Inmarsat or Satellite phone service, etc.

Operating environment 1500 typically includes at least some form of computer readable media. Computer readable media can be any available media that can be accessed by processing unit 1502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible or non-transitory medium which can be used to store the desired information.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In examples, the computer storage media may store sharable carts and instructions to create, modify, or otherwise interact with sharable carts.

The operating environment 1500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Figure 16:
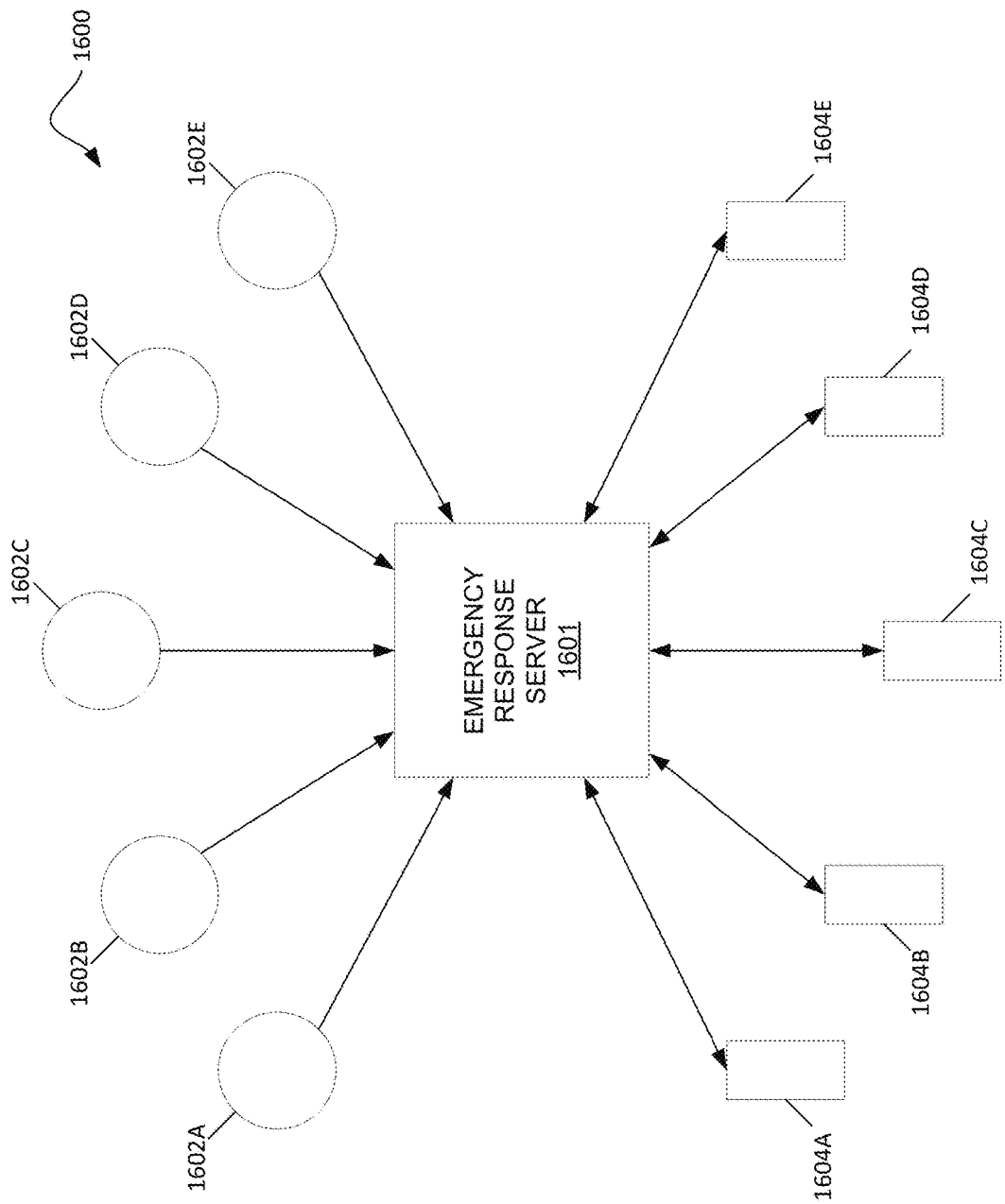
FIG. 16 depicts a system for aggregating and delivering video data from a plurality of video sources.

FIG. 16 depicts a system 1600 for aggregating and delivering video data from a plurality of video sources 1602A-E. In the system, an emergency response server 1601 receives video data from a plurality of video sources 1602A-E and distributes the video data to a plurality of client devices 1604A-E. The video sources may be any type of device that has the capability to capture video. For instance, the video sources 1602A-E may be include mobile devices having cameras, such as smart phones and tablets. The video sources 1602A-E may also include drones, security cameras, wearable devices (such as headsets, body cameras, or other wearable cameras), traffic cameras, and dash cameras on vehicles, among other potential video sources. Each of the video sources 1602A-E may also incorporate GPS technology (or other location identifying technology) that further allows the video sources 1602A-E to communicate their respective locations to the emergency response server 1601. For instance, for stationary devices, the location may also be identified based on an IP address or metadata associated with the device or video feed. Similarly, the video sources 1602A-E may also provide information about their orientation, such as the direction the camera is pointed. In other examples, location and orientation information about the video sources 1602A-E may be known or fixed, such as with fixed security cameras. Such location and orientation information may be acquired by the emergency response server from additional sources and/or the location and orientation information may be manually input into the emergency response server 1601. While FIG. 16 depicts only five video sources 1602A-E, it should be appreciated that the system is capable of handling any number of video sources.

Upon receiving the video data from the video sources 1602A-E, the emergency response server 1601 aggregates the data and in some examples, the emergency response server 1601 records and saves the video data for a period of time. Based on requests from the client devices 1604A-E, the emergency response server delivers the video data from the video sources 1602A-E to the client devices 1604A-E. The client devices 1604A-E may be any type of client device discussed herein, such as smart phones and tablets. In some examples, each of the client devices 1604A-E may also serve as a video source to provide additional video data to the emergency response server 1601. The video data that is provided to the client devices 1604A-E may be selected and combined by the emergency response server 1601, as discussed further below with reference to FIGS. 17A-E. The location and orientation information of the respective video sources 1602A-E may also be provided to the client devices 1604A-E. Video data from different video sources 1602A-E can be combined and provided to different client devices 1604A-E. As an example, video data from video source 1602A and video source 1602D may be provided to client device 1604A, while video data from video sources 1602B-E may be provided to client device 1064C. It should be appreciated that any combination of video sources 1602A-E may be provided to any one of the client devices 1604A-E. In addition, while FIG. 16 depicts only five client devices 1604A-E, it should be appreciated that the system is capable of handling any number of client devices.

Figure 17A:
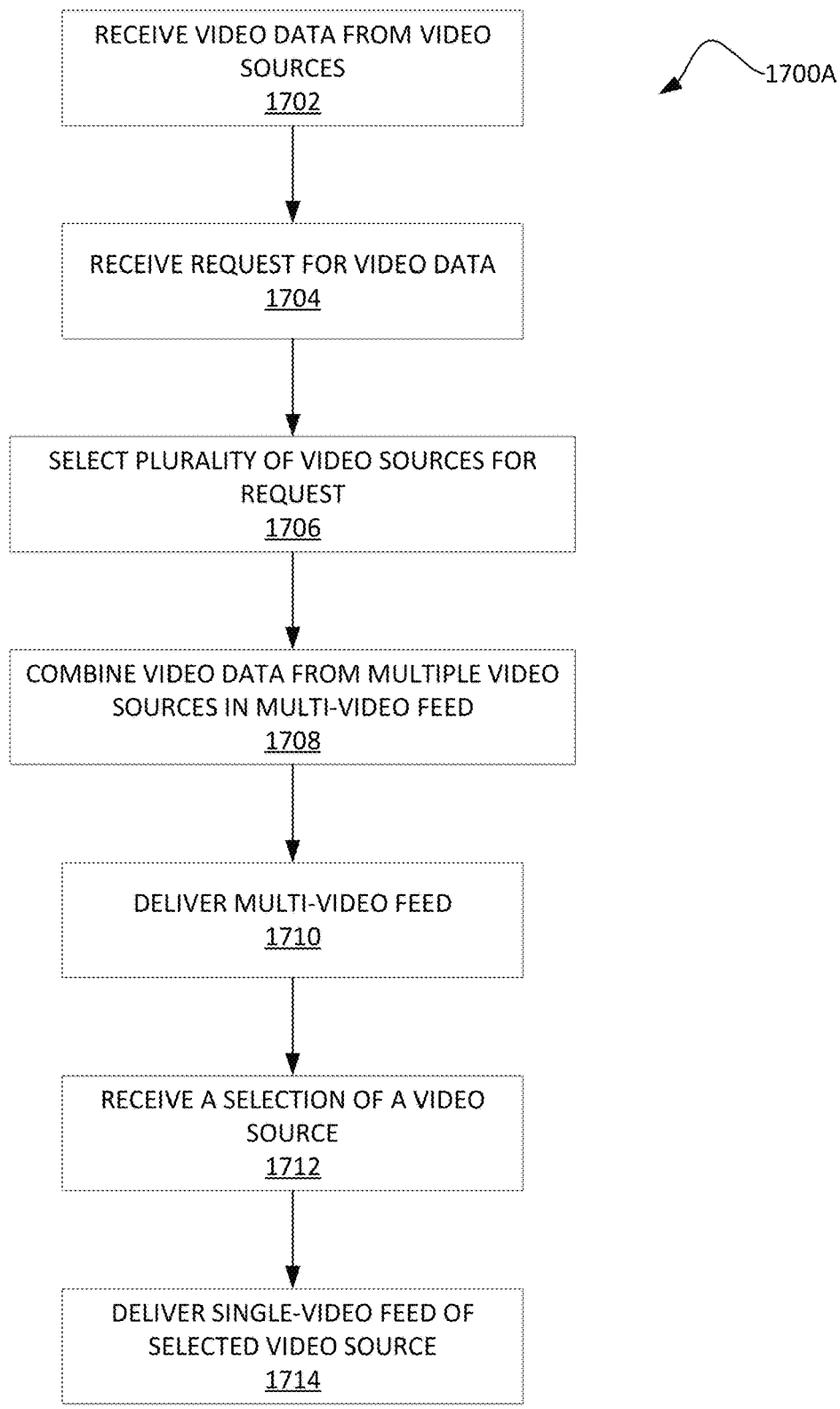
FIG. 17A depicts a method for providing video data for use in emergency response scenarios.

FIG. 17A depicts a method 1700A for providing video data for use in emergency response scenarios. At operation 1702, video data from a plurality of video sources is received. For example, the video sources may be those depicted in FIG. 16 (e.g., video sources 1602A-E) and the video data may be received by an emergency response server. Location and orientation information for the video sources may also be received in operation 1702. The video data, once received, may be aggregated, recorded, and/or otherwise stored in a manner that allows for the received video data to be delivered to another device.

At operation 1704, a request is received for video data. In some examples, the request is received from a mobile client device. The request may result from a selection by a user of an option or feature in a mobile application to view video data. The request may be for video data near the user or relating to an ongoing event or emergency situation involving the user. For example, a user of a client device may be involved in an emergency situation and need to see video data from video sources near or related to the emergency situation. In addition, a request may automatically be generated by the system if an emergency situation is detected or initiated. Other automated request may also occur based on particular locations, movements, times, or other potential factors.

At operation 1706, a plurality of video sources are selected based on the request received at operation 1704. The selection of video sources may be made automatically based on algorithmic logic decisions or manually. In other examples, the selection of video sources is made by a combination of automation and manual overrides. For instance, an automated process may select a plurality of video sources and a human may review and modify that selection. Where the selection process occurs automatically, or at least partially automatically, the selection may be based on the at least the location of the client device, credentials associated with the user of the client device, and/or a relationship between the user of the client device and one or more video sources. For example, at least some the video sources that are closest to the client device may be selected because they are a likely the most useful to the user at the time of the request. The video sources selected may also be limited by the credentials or security clearances of the user of the client device. For example, users having particular roles, such as police officers, may be granted access to more video sources than a security guard. In addition, the user may have a relationship with some of the video sources. For example, the user may work a security company that owns or accesses a plurality of security cameras on a property or location. Accordingly, those security cameras may be selected for that type of user. As another example, a police officer may have a relationship with dash cams on police vehicles or body cams of other officers, and those video sources may therefore be selected. Other logic decisions may also be made to automatically select video sources. While any number of video sources may be selected, the number of video sources selected may be based on the type of client device from which the request was received in operation 1704. For example, a smart phone may have limited screen space to display video data as compared to larger devices, such as tablets. In some examples, eight video sources are selected for a smart phone client device and sixteen video sources are selected for a tablet client device.

At operation 1708, video data from the video sources selected in operation 1706 are combined into a multi-video feed. The multi-video feed includes the combined video data from each of the video sources such that a client device can display the multi-video feed to see the video data from each of the selected video sources. The multi-video feed may be a single feed or video stream. As such, utilizing the multi-video feed is in contrast to sending an individual feed for each of the selected video sources. In combining the video data from the video data sources, the video data from each of the video sources may be reduced in size, definition, resolution, or other quality characteristics to reduce the amount of data required to transmit the respective video data. Although, the size, definition, resolution, or quality characteristics of the video may be reduced, the video data from each video source may be displayed on a client device concurrently. Thus, the lower resolution video data may not be noticed by user due to the smaller screen and viewing area. The amount to reduce the resolution of the video data may be determined based on the number of video sources selected in operation 1706 and the connection type to the client device. For instance, where the client device is connected by a 4G network, the resolution of the video feeds may need to be reduced more than if the client device is connected via an LTE network or Wi-Fi connection. Accordingly, by combining video data from multiple video sources into one multi-video stream, bandwidth usage can be conserved and more easily controlled.

In some examples, multiple multi-video feeds may be generated in operation 1708. For instance, in some scenarios, it may be preferable to combine a first subset of the video sources into a first multi-video feed and a second subset of the video sources into a second multi-video feed. The use of multiple multi-video feeds may be used with better connection and/or the client device having additional display space. For instance, where the connection speed is higher, multiple multi-video feeds may be sent. Similarly, if there is additional display space on the client device, such as with a tablet, multiple multi-video feeds may be provided to include additional video data from additional sources. For example, if sixteen video sources are selected in operation 1706, video data from eight of the video sources is be combined into a first multi-video feed and video data from the remaining eight video sources is combined into a second multi-video feed. In other examples, a single multi-video feed may also be used that combines video data from all sixteen video sources.

Once the video data is combined into one or more multi-video feeds, the one or more multi-video feeds are delivered to the client device at operation 1710. The multi-video feed utilizes or consumes a particular bandwidth amount, which may be based on factors such as number of video sources selected, network connection, and client device type, as discussed above. The multi-video feed maybe delivered in such a manner that the client device receives video data that is live or substantially live. As used herein, substantially live means that the video data delivered to the client device is within five minutes of when the video was taken by the video source.

At operation 1712, a selection of a particular video source is received from a client device. For example, the selection of the particular video source may be received based on a user of the client device selecting an option for the particular video source. Upon receiving the selection of the particular video source, a single-video feed for the selected video source is delivered to the client device at operation 1714. The single-video feed includes video data from the selected video source and the single-video feed utilizes, or consumes, substantially the same amount of bandwidth as the multi-video feed. As such, the bandwidth utilization or consumption may not substantially change in switching from the multi-video feed to the single-video feed. As should be appreciated, by providing the single-video feed in a manner that utilizes substantially the same bandwidth as the multi-video feed, the single-video feed can have better resolution, which is helpful as the single-video stream is often displayed in a larger format than its equivalent portion of video data in the multi-video feed. In some examples, the single-video feed is delivered in a manner such that it utilizes less bandwidth than the multi-video feed. In other examples, the single-video feed is delivered in a manner such that it utilizes more bandwidth than the multi-video feed. Such a configuration may be used where the user desires to see finer details in the single-video feed.

Figure 17B:
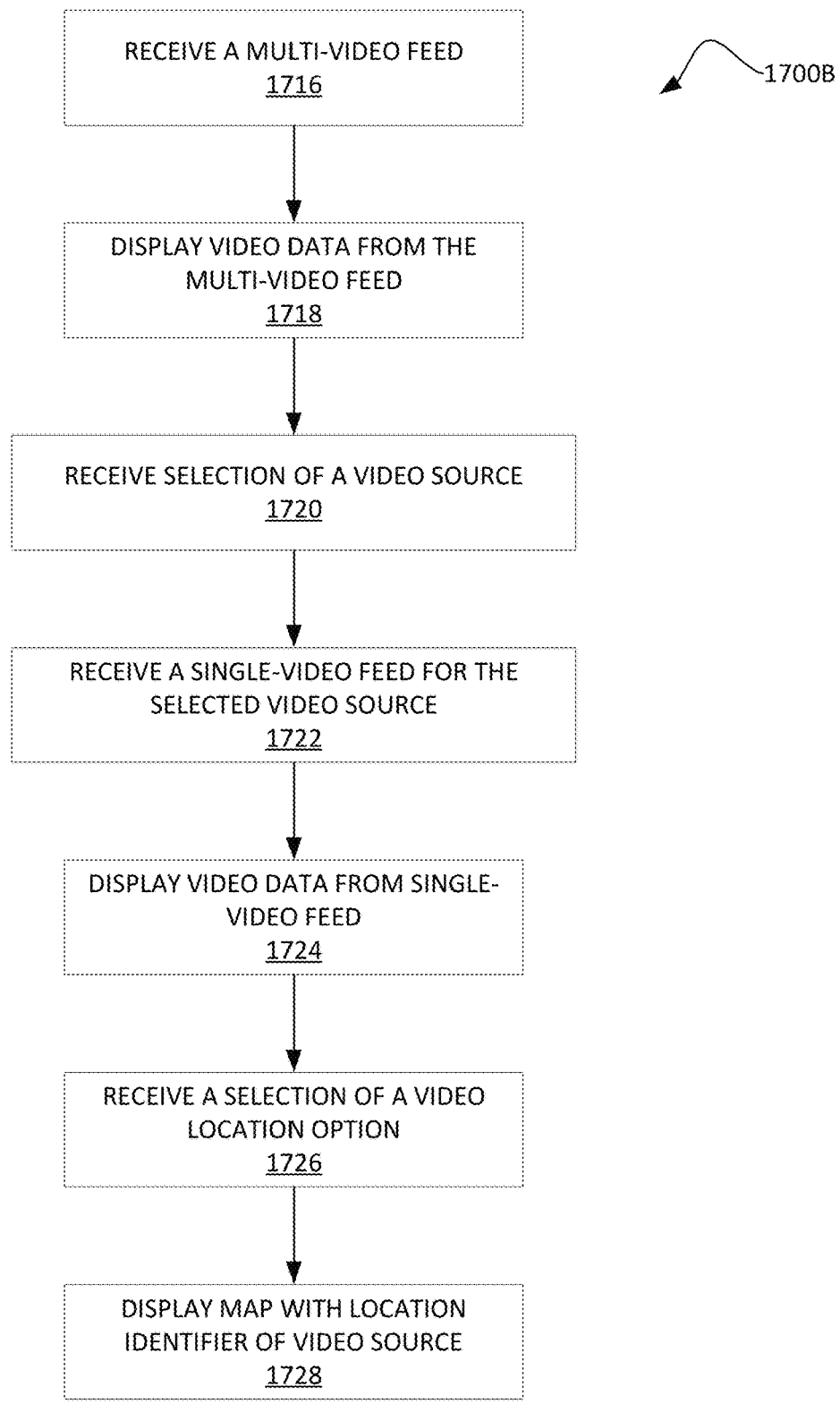
FIG. 17B depicts a method 1700B for displaying video data on a mobile client device.
Figure 17C:
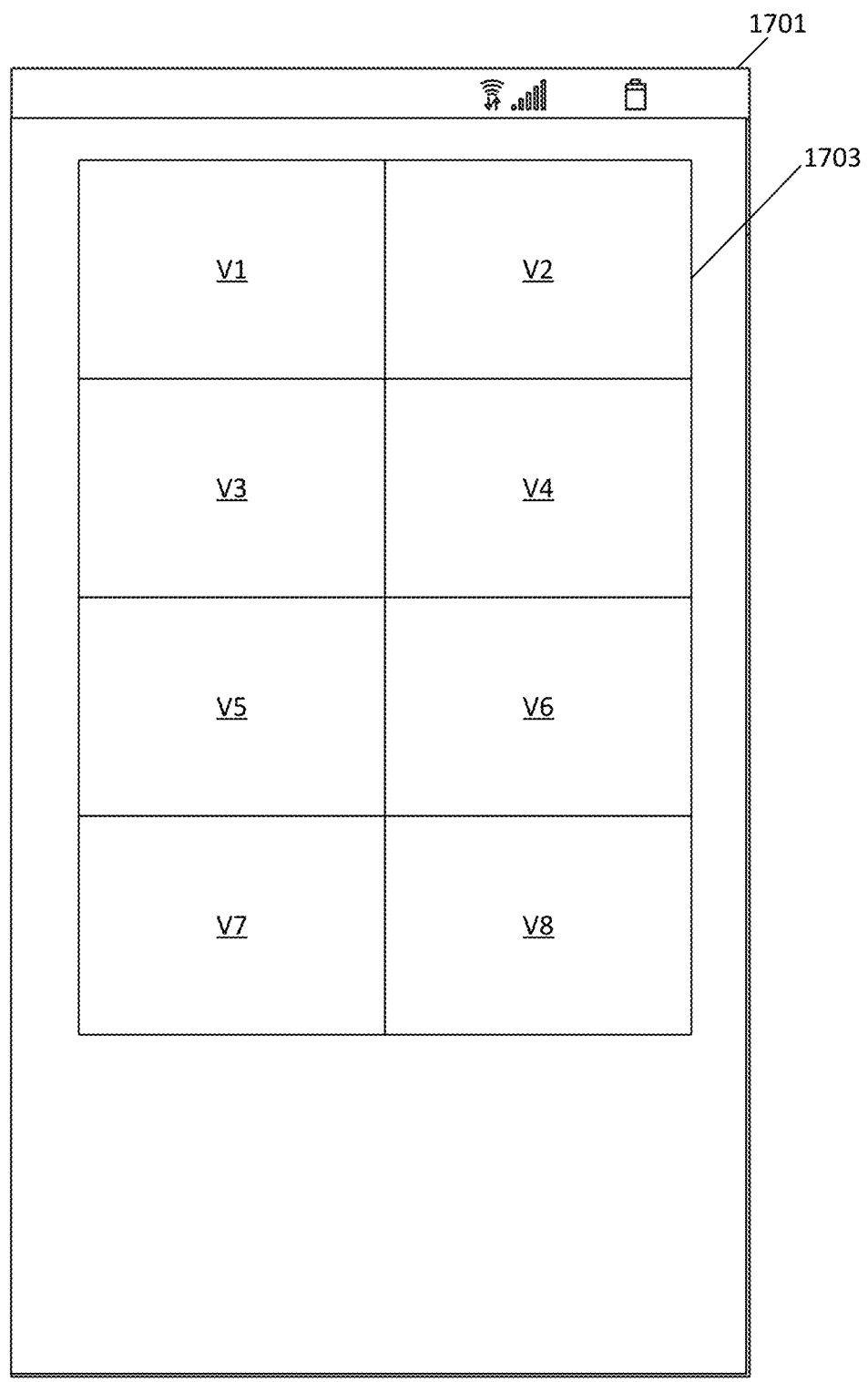
FIG. 17C depicts an example display of video data from a multi-video feed on the client device.

FIG. 17B depicts a method 1700B for displaying video data on a mobile client device. At operation 1716, one or more multi-video feeds are received by the client device. The multi-video feed(s) may be the multi-video feed(s) delivered in operation 1710 of method 1700A depicted in the FIG. 17A. Accordingly, the multi-video feed includes combined video data from at least two video sources and utilizes a particular bandwidth. At operation 1718, the video data in the received multi-video feed is displayed on the display screen of the client device. FIG. 17C depicts an example display of video data from a multi-video feed on the client device 1701. The video data is displayed in a video interface 1703. In the example depicted, the video data is displayed in tiles V1-V8 corresponding to each different video source included in the multi-video feed. In the example depicted, the multi-video feed included video data from eight different video sources and the video data for each video source is displayed in a corresponding tile V1-V8.

Returning to method 1700B depicted in FIG. 17B, a selection of a video source is received at operation 1720. The selection of the video source may be a selection of displayed video data corresponding to a particular video source. For example, in the interface depicted in FIG. 17C, a selection of the video source corresponding to tile V1 may be received upon a user selecting the V1 tile either through touch input or any other suitable input mechanism.

Figure 17D:
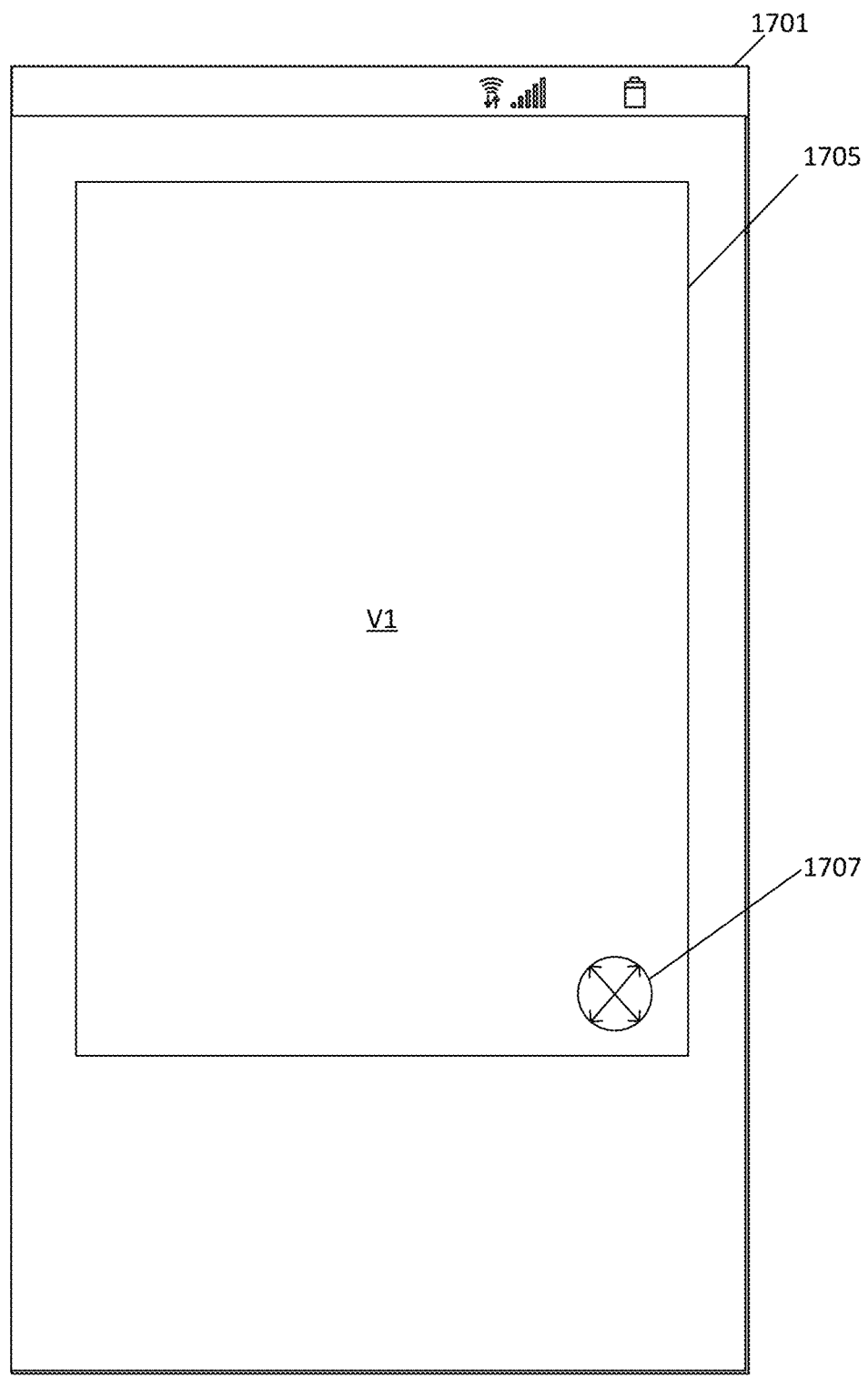
FIG. 17D depicts an example display of video data from a single-video feed on the client device.

Upon receiving the selection of the video source, a single-video feed for the selected video source is received at operation 1722. The single-video feed may be the same single-video feed delivered in operation 1714 of method 1700A depicted in FIG. 17A. Accordingly, the single-video feed may utilize substantially the same amount of bandwidth as the multi-video feed. The video data from the single-video feed is then displayed at operation 1724. FIG. 17D depicts an example display of video data from a single-video feed on the client device 1701. In the example depicted, the user has selected the tile V1 from FIG. 17C. As a result, the video data from the video source associated with tile V1 is displayed in a larger format in video interface 1705.

Returning to method 1700B of FIG. 17B, a selection of a video location option may be received at operation 1726. The video location option may be a selectable option displayed on the mobile device. For instance, in the example depicted in FIG. 17D, a video location option 1707 may be displayed as an overlay of a video. While the video location option is depicted as being displayed as an overlay over a single-video feed video interface, each tile V1-V8 in FIG. 17C may also include its own respective video location option.

Figure 17E:
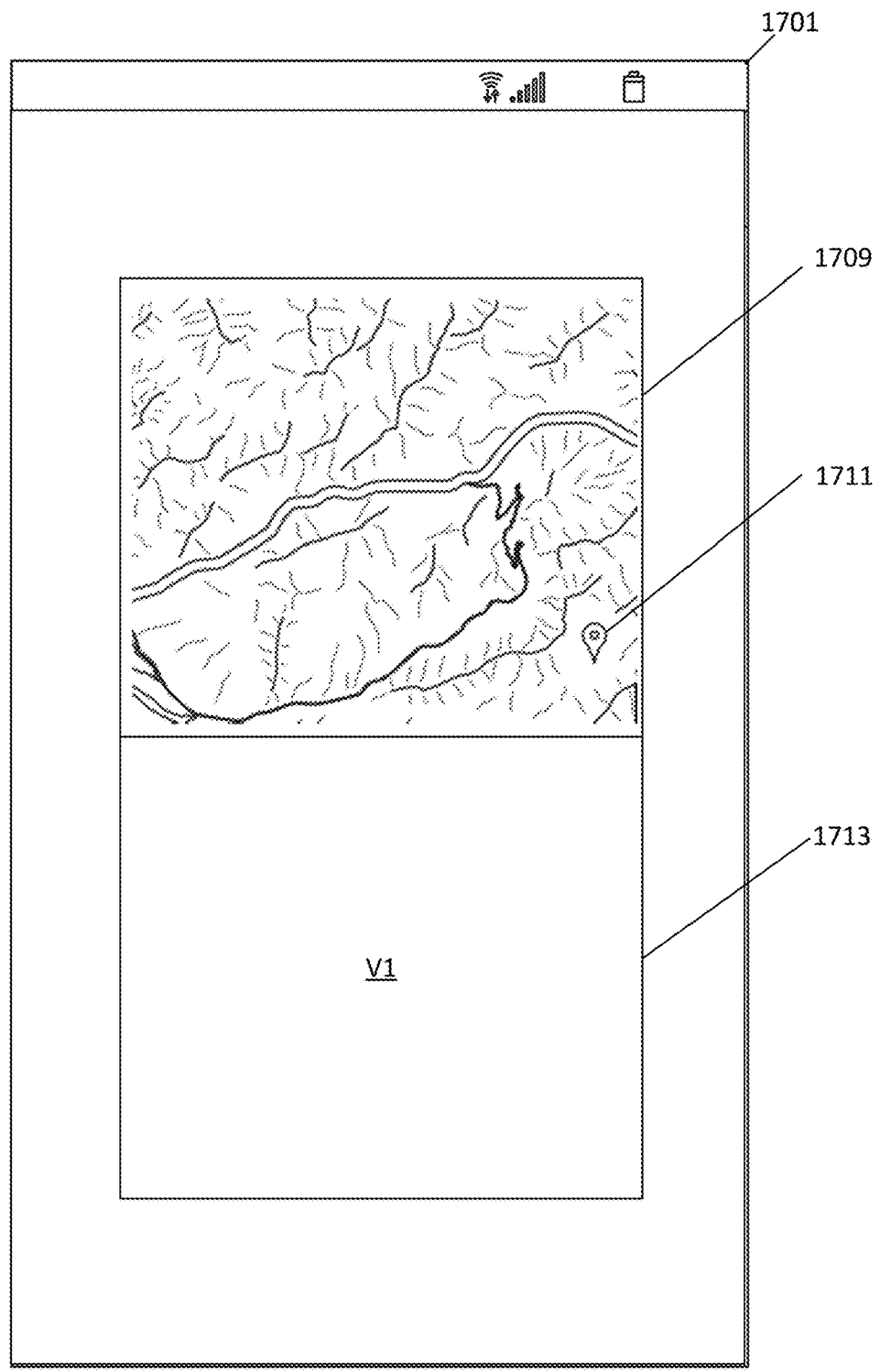
FIG. 17E depicts an example display of a map with a location identifier for a selected video source.

Once the video location option has been selected, a map with a location identifier for the video source is displayed at operation 1728. FIG. 17E depicts an example display of a map 1709 with a location identifier 1711 for the video source corresponding to the tile V1. In the example depicted, the map 1709 and the video data from the corresponding video source are displayed concurrently. For instance, the map 1709 is displayed above the video interface 1713. While not depicted in FIG. 17E, the location identifier 1711 for the video source may also indicate movement information and/or orientation information for the video source. For example, the location identifier 1711 may be shown as moving to indicated that the video source is moving in a particular direction at a particular rate. Such information may be available and useful where the video source is a dash cam or drone, among other moving video sources. The orientation of the video source may also be shown by an arrow, a directional cone or fan, or any other visual indicator that shows which direction the camera on the video source is pointing.

Figure 18A:
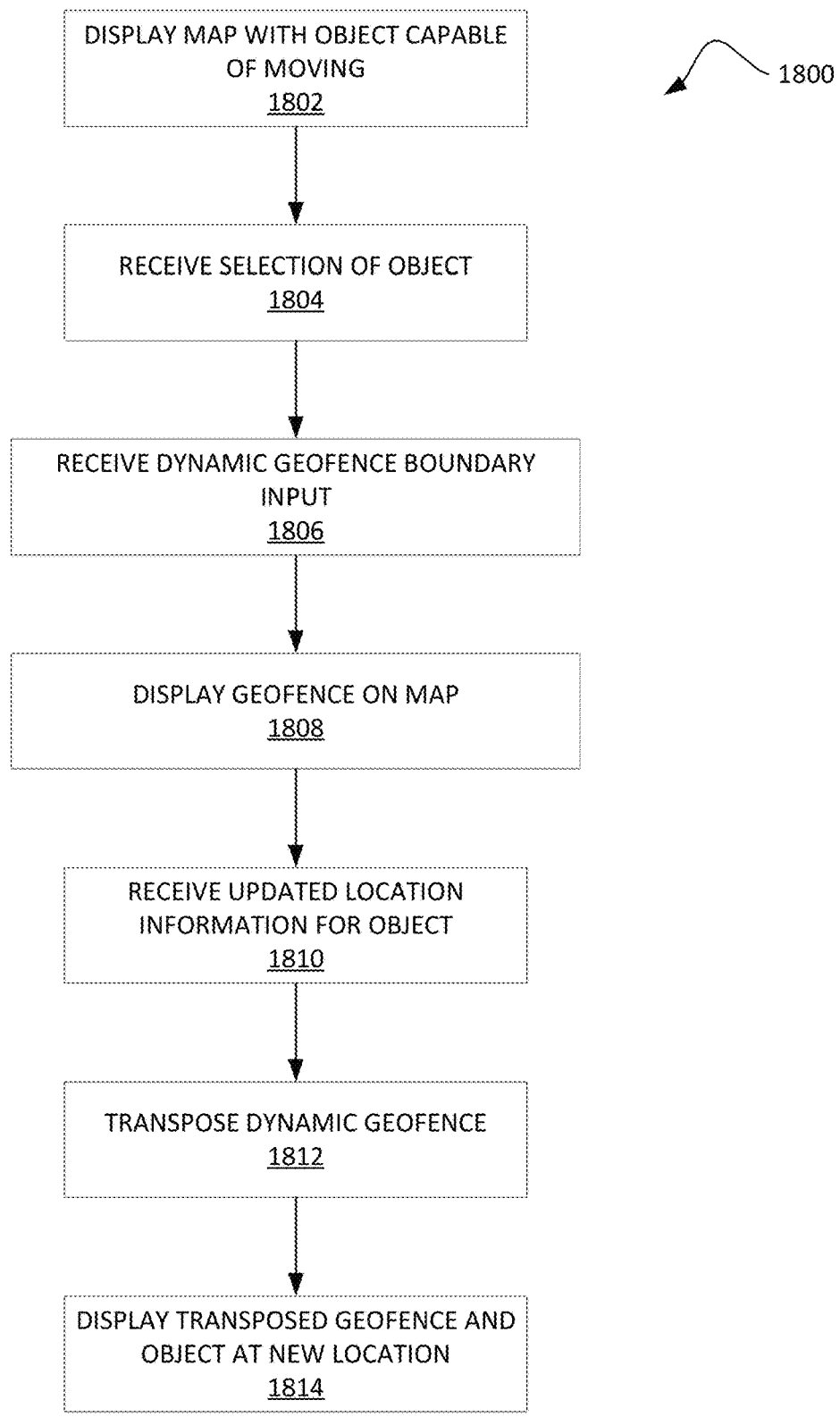
FIG. 18A depicts a method for generating and operating a dynamic geofence.
Figure 18B:
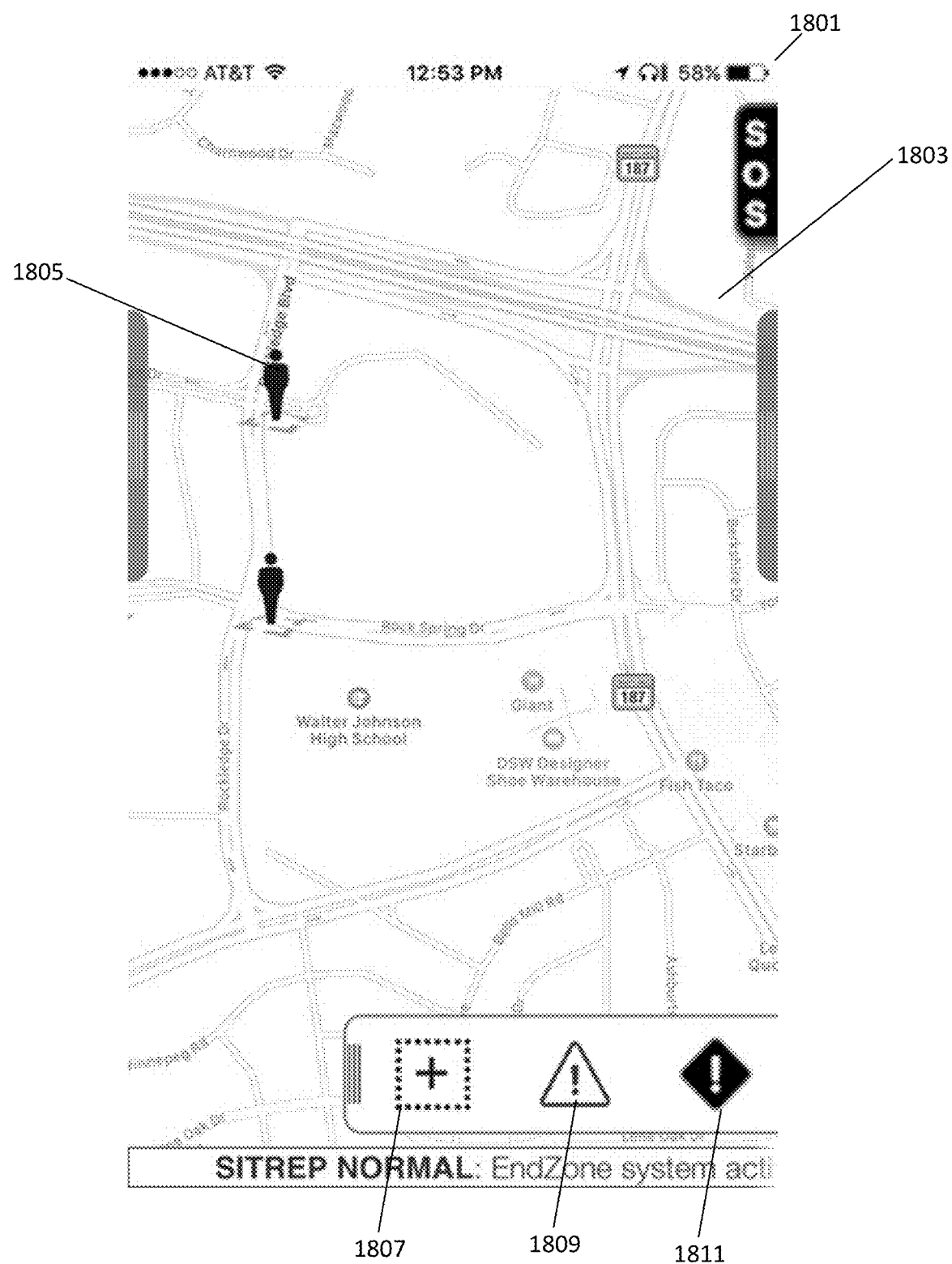
FIG. 18B depicts an example interface of a map displayed on a client device.

FIG. 18A depicts a method 1800 for generating and operating a dynamic geofence. At operation 1802, a map is displayed with an object that is capable of moving. In some examples, the object may be a person associated with a client device, an automobile, or any other object that moves. FIG. 18B depicts an example interface of a map 1803 displayed on a client device 1801. An object 1805 is also displayed on the map 1803. In the example depicted, the object is a person associated with a client device. The location of the person displayed on the map 1803 is based on the location of the associated client device. The assumption is generally that the person is in the same location as his or her client device. A set of options may also be displayed in the interface. For example, an option 1807 for creating a dynamic geofence with a positive implication may be displayed as an overlay on the map 1803. An option 1809 may also be displayed for creating a dynamic geofence with negative implication, such as a high-risk area, or danger zone. A dynamic geofence with a positive implication is a geofence for which it is desired to keep people within the boundary of the geofence. For example, a dynamic geofence with a positive implication may be used by a squadron leader that wants to keep all members of the squadron within 200 yards of his or her position. In contrast, a dynamic geofence with a negative implication may be a danger zone, which is also referred to as a high-risk area. The details of a danger zone are discussed above. A third option 1811 may also be displayed for sending alerts to individuals displayed on the map 1803. The alerts and messages that may be sent to such individuals are the same or similar alerts and messages as discussed above.

Returning to method 1800 in FIG. 18A, at operation 1804 a selection of the object may be received. In some examples, the object may be the user of the client device. In such an example, the default selection that is received is of the user. The user, however, can override this default selection and select another object on the map. Once the user has selected an object, or the user has been selected by default, an interface to create a dynamic geofence may automatically be displayed. In other examples, a selection of an option to launch the dynamic geofence creation interface may need to be selected. Two examples of such an option are option 1807 and option 1809 depicted in FIG. 18B and discussed above. From the dynamic geofence creation interface, input is received at operation 1806 to set the boundary of the dynamic geofence relative to the selected object. The boundary of the geofence can be any shape. For example, the boundary may be a rectangle, square, circle, oval, or a hand drawn boundary. The boundary may also have any shape or characteristics of the danger zone (or high-risk area) as discussed above. Automated boundaries may also be generated for the dynamic geofence based on the type of activity being performed. For example, particular operations may result in a dynamic geofence being centered on a leader and having a 200 yard radius. Of note, however, the dynamic geofence need not be centered on any object. For instance, the object may be off-center of the dynamic geofence. In addition, the boundaries of the geofence are connected to the object and are defined with reference to the object. Thus, as the object moves, the geofence will move with the object. Once the boundary of the dynamic geofence has been set, the dynamic geofence is displayed on the map at operation 1808.

Figure 18C:
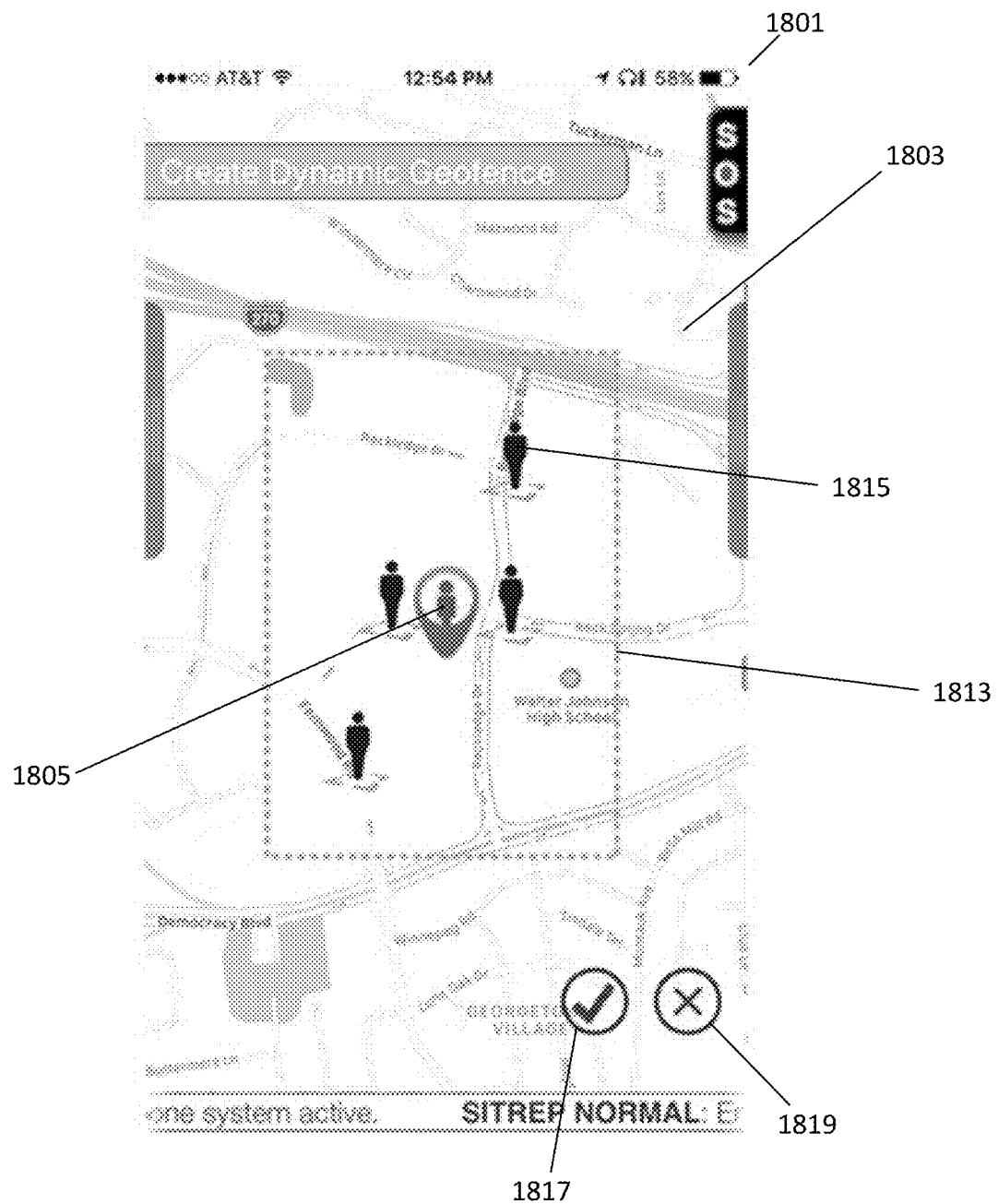
FIG. 18C depicts an example dynamic geofence creation interface on a client device.

FIG. 18C depicts an example dynamic geofence creation interface on a client device 1801. The dynamic geofence creation interface includes the map 1803 and the selected object 1805. A dynamic geofence 1813 is also displayed on the map 1803 showing its current boundary settings. A user may modify the boundary of the dynamic geofence 1813 by dragging any side or corner of the dynamic geofence 1813. Once the user is satisfied with boundary settings for the dynamic geofence, the user may select the accept option 1817. If the user wishes to discard the current boundary settings, the discard option 1819 may selected.

Figure 18D:
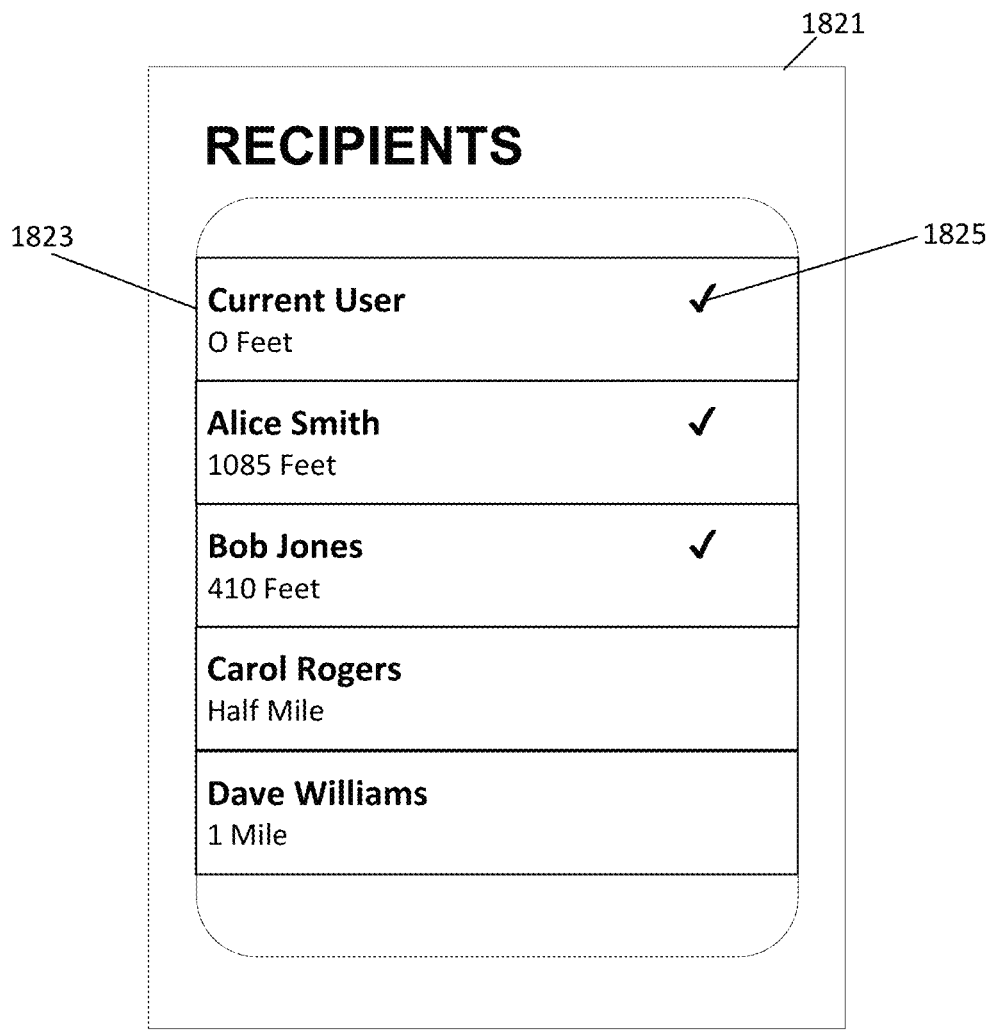
FIG. 18D depicts an example interface for listing the persons that are within or near the set boundary of the dynamic geofence.

As depicted in the example shown in FIG. 18C, several other persons are within the boundary of the dynamic geofence 1813. In such an example, a list of these persons may be displayed in an interface. FIG. 18D depicts an example interface 1821 for listing the persons 1823 that are within or near the set boundary of the dynamic geofence. For each person 1823, the distance from the selected object is displayed. In the example depicted, the current user is the selected object as is therefore zero feet from himself or herself. A selection option 1825 is also displayed for each person 1823. Activating the selection option 1825 for a particular person 1823 causes that person to be associated with the dynamic geofence and become a group member. By being associated with the dynamic geofence, the group members will receive alerts or messages associated with the geofence, as discussed further below. In the example depicted in FIG. 18D, the current user, Alice Smith, and Bob Jones have all been selected as group members.

Returning to method 1800 of FIG. 18A, at operation 1810, updated location information for the selected object is received. The updated location information for the selected object indicates a new location for the object, such as when the object moves. Based on new location for the selected object, the dynamic geofence is transposed at operation 1812 such that the dynamic geofence boundary remains fixed relative to the object. At operation 1814, the transposed dynamic geofence is displayed along with the selected object at its new location.

If, at any point after the boundary of the dynamic geofence has been set, a group member crosses the boundary, an alert may be sent to one or more of the group members. In an example where the dynamic geofence has a positive implication, if a group member leaves the dynamic geofence, an alert will be generated for that group member. The alert will notify the group member that he or she has left the dynamic geofence. The group member will then have an opportunity to respond to the alert. If no response is received from the group member within a predetermined amount of time, an alert may be sent to the remainder of the group members indicating that the other group member has left the dynamic geofence. In some examples, the user that set the boundary of the dynamic geofence may then modify the boundary of the dynamic geofence to re-include the group member that left the dynamic geofence if the creating user believes the dynamic geofence should be extended. The creating user may also modify the size and shape of the dynamic geofence at any time. In an example where the dynamic geofence has a negative connotation, such as a high-risk area or danger zone, an alert will be generated when a group member enters the high-risk area. Other group members may also receive an alert indicating that a group member has entered a high-risk area. Other alerts, notifications, messages, and settings discussed above with respect to danger zones may also be applicable to dynamic high-risk areas.

Multiple dynamic geofences may also be generated. For instance, a first dynamic geofence may be created based on a first object capable of moving (e.g., a first person) and a second dynamic geofence may be generated based on a second object capable of moving (e.g., a second person). Where multiple dynamic geofences are generated, in some examples, a group member may only be associated with one of the dynamic geofences. For instance, if a second dynamic geofence is created, the interface of FIG. 18D may display persons that are already associated with a first geofence as greyed out or otherwise indicate that such persons are already associated with another dynamic geofence. In other examples, a group member may be associated with multiple dynamic geofences. In such examples, alerts may be generated based on the group member crossing the boundary of either one of the dynamic geofences for which the member is associated. In other examples, an alert may only be generated when the group member has crossed the boundary of all the dynamic geofences for which the group member is associated.

Although specific embodiments and aspects were described herein and specific examples were provided, the scope of the invention is not limited to those specific embodiments and examples. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

The invention claimed is:

1. A computer-implemented method for providing video data in emergency response, the method comprising:
receiving a request from a mobile client device to receive video data;
automatically selecting a plurality of video sources to incorporate into a first multi-video feed, wherein selecting the plurality of video sources is based on at least one of a credential associated with the user of the client device or a relationship between the user of the client device and one or more video sources in the plurality of video sources;
combining video data from at least two of the plurality of video sources into the first multi-video feed;
delivering the first multi-video feed to the mobile client device, wherein the first multi-video feed utilizes an amount of bandwidth;
receiving, from the mobile client device, a selection of one of the video sources in the first multi-video feed; and
delivering a single-video feed to the mobile client device, wherein the single-video feed includes the video data from the selected video source and the single-video feed utilizes substantially the same amount of bandwidth as the first multi-video feed.

2. The computer-implemented method of claim 1, further comprising:
combining video data from at least two additional video sources from the plurality of video sources into a second multi-video feed; and
delivering the second multi-video feed concurrently with the first multi-video feed.

3. The computer-implemented method of claim 1, wherein the plurality of video sources include at least two of: a mobile device, a drone, a security camera, a wearable device, a traffic camera, or a dash camera.

4. The computer-implemented method of claim 1, wherein selecting the plurality of video sources is further based on a location of the mobile client device.

5. The computer-implemented method of claim 1, further comprising aggregating the video data from the plurality of video sources.

6. The computer-implemented method of claim 1, wherein the multi-video feed includes video data from at least eight different video sources.

7. A computer-implemented method for displaying video data on a mobile client device, the method comprising:
receiving a multi-video feed, wherein the multi-video feed includes combined video data from at least two video sources;
displaying the video data from the multi-video feed;
receiving a selection of one of the at least two video sources;
based on receiving the selection, receiving a single-video feed that includes video data from the selected video source, wherein the single-video feed utilizes substantially the same amount of bandwidth as the multi-video feed; and
displaying the video data from the single-video feed.

8. The computer-implemented method of claim 7, further comprising:
displaying a selectable video location option;
receiving a selection of the video location option for a video source in the at least two video sources; and
in response to receiving the selection of the video location option, displaying a map with a location identifier for the selected video source.

9. The computer-implemented method of claim 8, wherein the location identifier further indicates at least one of movement information for the video source or orientation information for the video source.

10. The computer-implemented method of claim 8, wherein the map and the video data associated with the selected video source are displayed concurrently.

11. The computer-implemented method of claim 8, wherein the selectable video location option is displayed as an overlay of the displayed video data from the single video feed.

12. A system for providing video data in emergency response, the system comprising:
at least one processor; and memory storing instructions that, when executed by the at least one processor cause the system to perform a set of operations comprising:
  receiving location data from a mobile client device;
  receiving location data for two or more mobile video sources of a plurality of video sources;
  automatically selecting, based on the location data from the mobile client device and the location data for the plurality of mobile video sources, the two or more mobile video sources to incorporate into a first multi-video feed;
  combining video data from at least the two or more mobile video sources into the first multi-video feed;
  delivering the first multi-video feed to the mobile client device, wherein the first multi-video feed utilizes an amount of bandwidth;
  receiving, from the mobile client device, a selection of one of the mobile video sources in the first multi-video feed; and
  delivering a single-video feed to the mobile client device, wherein the single-video feed includes video data from the selected mobile video source and the single-video feed utilizes substantially the same amount of bandwidth as the first multi-video feed.

13. The system of claim 12, wherein the operations further comprise:
  combining video data from at least two additional video sources from the plurality of video sources into a second multi-video feed; and
  delivering the second multi-video feed concurrently with the first multi-video feed.

14. The system of claim 12, wherein the at least two mobile video sources include at least two of: a drone, a wearable device, a or a dash camera.

15. The system of claim 12, wherein the operations further comprise:
  receiving an emergency situation indication from the mobile client device; and
  wherein delivering the multi-video feed to the mobile client device is performed in response to receiving the emergency situation indication from the mobile device.

16. The system of claim 12, wherein receiving location data from a mobile client device comprises receiving location data signals at long intervals when the mobile client device is in a non-emergency mode and receiving location data signals at short intervals when the mobile client device is in an emergency mode.

17. The system of claim 12, wherein selecting the plurality of video sources is performed further based on at least one of: credentials associated with the user of the client device or a relationship between the user of the client device and one or more video sources in the plurality of video sources.

18. The system of claim 12, wherein the operations further comprise:
  receiving a selection of a video location delivering a single-video feed; and
  in response to receiving the selection of the video location option, causing the display of a map with a location identifier for the video source of the single-video feed.

19. The system of claim 12, wherein the operations further comprise aggregating the video data from the plurality of video sources.

20. The system of claim 12, wherein the multi-video feed includes video data from at least eight different video sources.

* * * * *